US006856411B1

(12) United States Patent
Purvis et al.

(10) Patent No.: US 6,856,411 B1
(45) Date of Patent: Feb. 15, 2005

(54) POLICY DRIVEN PRINT ENGINE

(75) Inventors: Lisa S. Purvis, Fairport, NY (US); Christopher LaRosa, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/371,038

(22) Filed: Aug. 10, 1999

(51) Int. Cl.⁷ ............................................. G06F 15/00
(52) U.S. Cl. .................................... 358/1.12; 358/1.15
(58) Field of Search ................................. 700/100, 102, 700/99; 358/1.15, 1.12; 709/100, 102

(56) References Cited

U.S. PATENT DOCUMENTS

| | | | |
|---|---|---|---|
| 5,129,639 A | * | 7/1992 | DeHority .................. 270/1.01 |
| 5,287,194 A | | 2/1994 | Lobiondo |
| 5,604,600 A | * | 2/1997 | Webster ...................... 358/296 |
| 5,696,893 A | | 12/1997 | Fromherz et al. |
| 5,701,557 A | | 12/1997 | Webster et al. |
| 5,710,635 A | | 1/1998 | Webster et al. |
| 6,335,795 B1 | * | 1/2002 | Neuhard et al. ........... 358/1.15 |

OTHER PUBLICATIONS

Steven Minton et al., "Minimizing conflicts: a heuristic repair method for constraint satisfaction and scheduling problems", Artificial Intelligence 58 (1992), pp. 161–205.
Rina Dechter, "Enhancement Schemes For Constraint Processing: Backjumping, Learning, and Cutset Decomposition", Artificial Intelligence 41 (1989/90), pp. 273–312.
Alan K. Mackworth, "Consistency In Networks of Relations", Artificial Intelligence 8 (1977), pp. 99–118.
Ian P. Gent et al., "An Empirical Study of Dynamic Variable Ordering Heuristics For the Constraint Satisfaction Problem", Principals and Practice of Constraint Programming, LNAI Series #1118, (1996), pp. 179–193.

Gamma, B., et al., *Design Patterns: Elements of Reusable Object Oriented Code*, Addison–Wesley Publishers, 1995, pp. 315–323.

Bjorn N. Freeman–Benson et al., "An Incremental Constraint Solver", Communications of the ACM, Jan. 1990, vol. 33, No. 1, pp. 54–63.

Eugene C. Freuder et al., "Partial constraint satisfaction", Artificial Intelligence 58 (1992), pp. 21–70.

* cited by examiner

Primary Examiner—Twyler Lamb
(74) Attorney, Agent, or Firm—Oliff & Berridge, PLC

(57) ABSTRACT

A scheduler for a machine includes a selector and a traverser. The selector selects the traverser and selects policies from a library based on a model of the machine. The traverser looks for a preferred itinerary. The scheduler includes a first module to choose an itinerary, a second module to calculate a combined weight, and logic to repeatedly operate the first and second modules to choose additional itineraries from the group of itineraries and calculate their combined weight until an end condition is reached. The end condition includes one or more of when a calculated combined weight for an itinerary exceeds a predetermined threshold, when a predetermined time has elapsed, when a combined weight for each of a predetermined number of itineraries has been calculated, and when a combined weight for each itinerary in the group of itineraries has been calculated. The first module chooses an itinerary from either a list of all of the itineraries or a sub-set of the itineraries. The second module includes an itinerary validator to compute an itinerary weight for the chosen itinerary for each of the policies and also includes a combiner to combine the computed itinerary weight for each of the policies into a combined weight for the chosen itinerary. The scheduler further includes a third module to choose an itinerary that has a combined weight calculated by the second module that is greater than a combined weight of any other itinerary calculated by the second module.

12 Claims, 14 Drawing Sheets

MODULE 1
FEEDER

CAPABILITY: FEED A4
CAPABILITY: FEED A5

MODULE 2
MARKER

CAPABILITY: MARK A4
CAPABILITY: MARK A5

MODULE 3
STACKER

CAPABILITY: STACK A4
CAPABILITY: STACK A5

*FIG. 10*

POLICY DRIVEN PRINT ENGINE

BACKGROUND OF THE INVENTION

1. Field of the Invention

The present invention relates to a scheduler to pick an itinerary in a printing machine to schedule the processing of sheets through the several modules of the printing machine. In particular, the invention relates to a scheduler that uses hard "must have" policies and soft "desired" policies to select an itinerary.

2. Description Of Related Art

Known printing machines schedule print jobs through the machine based, at least in part, on the capabilities of the machines. A sheet to be processed through the machine is scheduled through each stage using a scheduler module that is controlled by scheduling software. Some approaches use scheduling policies (e.g., "use tray1 if tray2 is low on paper") that specify criteria that must be satisfied to process the print job. In known machines, such policies are written into the logic of the scheduling software during a software development phase of the development of the printing machine. The policies are coded into the logic of the scheduling software, and the scheduling software is stored in a memory such as a ROM before the printing machine is shipped.

Scheduling rules and policies are typically dependent on the machine hardware being developed. For example, a developer of scheduling software would know, during the development time, that the duplex paper path of a particular product (e.g., for printing two sided copies) can hold a maximum of eight 8½"×11" sheets. This means that a sheet that enters the duplex paper path will re-emerge eight pitches later since the duplex paper path is a non-stop loop. A pitch is the amount of time it takes to make one image. If the hardware is ever changed so that the length of the duplex loop changes, the software will also need to be changed.

Other strategies for sheet scheduling are also product-specific and hard coded. For example, casual use products may strive for a low first-copy-out time, whereas production products may want to minimize the total run time even if it delays the first print out time. Once these types of policies are coded into the print scheduler, they necessitate changing the software if the policy for the product changes.

Because known systems pre-code the scheduling policies into the logic of the scheduling software, the scheduling software is static, difficult to update and not reusable on other printing machines. For example, a printing machine may be of a modular design and use a feeder module, a marker module and a stacker module, but after product release, the marker module may be redesigned to add new capabilities. Even though the modules themselves may be designed to be interchangeable, the scheduling software would have to be rewritten.

SUMMARY OF THE INVENTION

It is an object of the present invention to provide a flexible scheduler for a printing machine that generates itineraries and is adaptable to diverse machine configurations and machine environments. It is another object of the invention to generate itineraries based on hard "must have" policies and soft "desired" policies.

These and other objects are achieved in a scheduler for a machine that includes a selector and a traverser. The selector selects the traverser and selects policies from a library based on a model of the machine. The traverser looks for a preferred itinerary. The scheduler includes a first module to choose an itinerary, a second module to calculate a combined weight, and logic to repeatedly operate the first and second modules to choose additional itineraries from the group of itineraries and calculate their combined weight until an end condition is reached. The end condition includes one or more of when a calculated combined weight for an itinerary exceeds predetermined threshold, when a predetermined time has elapsed, when a combined weight for each of a predetermined number of itineraries has been calculated, and when a combined weight for each itinerary in the group of itineraries has been calculated.

BRIEF DESCRIPTION OF DRAWINGS

The invention will be described in detail in the following description of preferred embodiments with reference to the following figures wherein:

FIG. 10 is a simplified model of the machine according to the invention;

DETAILED DESCRIPTION OF PREFERRED EMBODIMENTS

Figure 1:
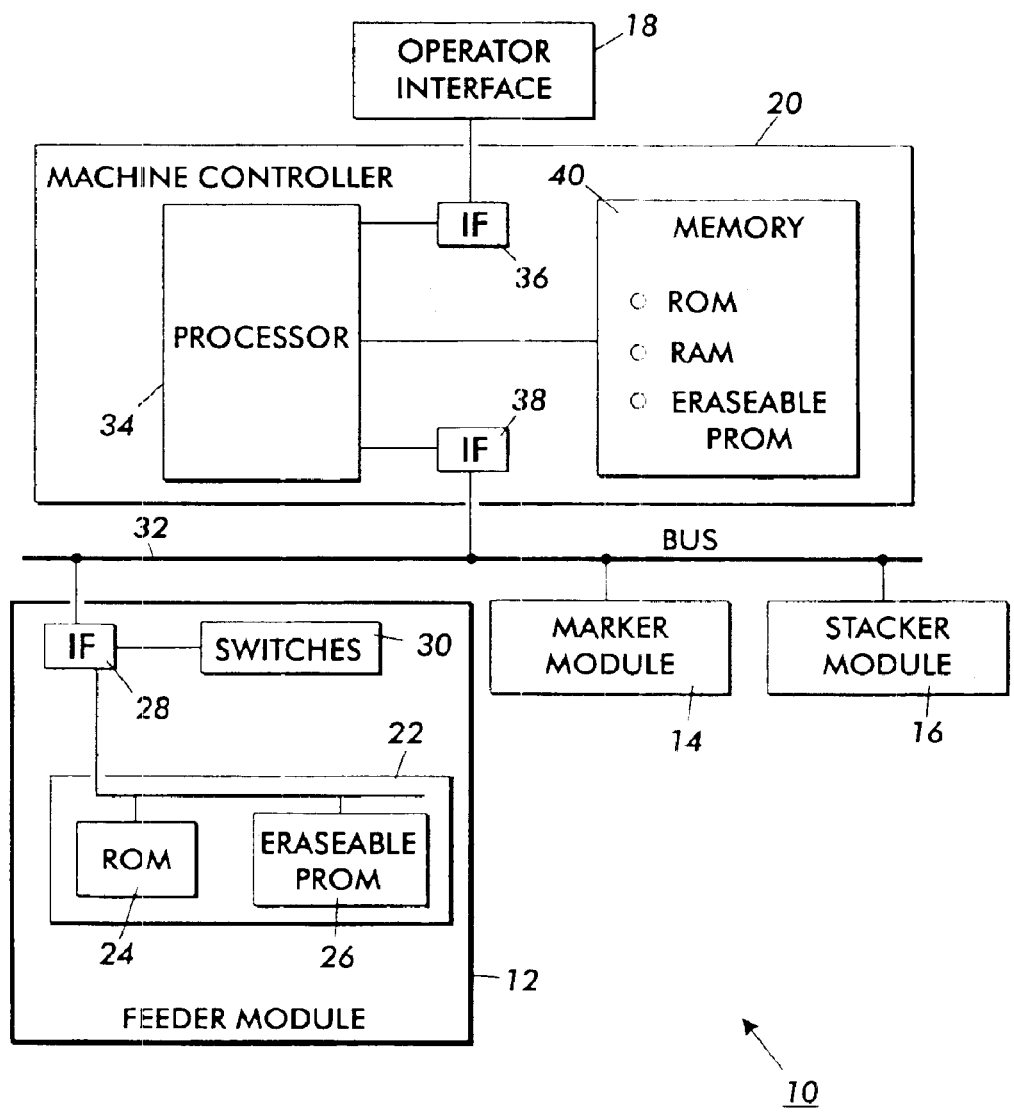
FIG. 1 is a functional block diagram of the invention.

The scheduler of this invention schedules print jobs through the printer in a way that is both flexible and extensible. In its simplest embodiment, the invention includes a model traverser operated at power up time that processes a model of the machine to generate a list of valid sheet itineraries, and a store traverser to process the list of valid sheet itineraries to select one itinerary suitable for processing a desired print job. Both the model traverser and the store traverser use an itinerary validator to check an itinerary against print scheduling policies, typically stored as data files.

A print scheduling policy is a criteria that a selected itinerary must satisfy to process a print job, where an itinerary for a sheet of the print job is a schedule of the required machine modules, together with the required capability and constraints of the modules, that are necessary to process the sheet. Policies may be machine independent or machine dependent. A machine independent policy is a policy that would be common across all products. A matching requirement that the properties of a sheet that is output from an itinerary must match the properties of the requested print sheet is an example of a machine independent criteria. A machine dependent policy is a policy that favors a desired characteristic of a particular product. For example, a printer that may or may not have a high capacity feeder could be designed to have a policy that favors use of the high capacity feeder, if present, for large jobs, but not for smaller jobs. However, other printers may be designed to have policies that do not favor the high capacity printer, even if present, on larger jobs. In such a case, each product's policies could be different.

The present invention provides a power up time scheduling process and a job run time scheduling process. The power up time scheduling process (e.g., FIG. 8) uses a Strategy Selector to select a Model Traverser and select configuration policies from a library of policies based on the configuration and environment of a target machine, and then uses the Model Traverser to process the model of the machine in accordance with the selected policies to prepare a list of valid itineraries.

The job run time scheduling process (e.g., FIG. 9) uses a Store Traverser (step S52), a print job description, and possibly run time selection policies (e.g., run time criteria) based on the model of the machine to search the list of valid itineraries stored in an itinerary store to find an itinerary that will be able to process the print job on the target machine. The itinerary includes the specific modules and capabilities that are needed to process the print job. The particular Store Traverser (there may be plural Store Traversers in a library) is selected by a Strategy Selector (step S51) either at power up time, or possibly a special Strategy Selector at run time.

The invention is particularly applicable to a flexible and extensible process of configuring a scheduler for printing jobs in a printing machine. However, it will be appreciated that the invention has broader application. For example, any machine from automated factory technologies to automated barn technologies that needs to coordinate individual modules to perform a job while achieving "plug and play" module interchangability will benefit from this invention. The invention provides a process to (1) obtain an automatic description of the machine, (2) determine a list of machine modes of operation (based on applicable policies) which are generally described by a coordination of the machine modules but referred to herein as itineraries, and (3) select a machine mode applicable to a job to be performed by the machine.

A machine controller of the printing machine develops and stores an electronic model of the machine (MoM). The MoM is a hierarchical data structure that includes representations for the machine modules, their capabilities, etc.

U.S. Pat. No. 5,701,557 to Webster, et al., incorporated herein by reference, describes an image processing apparatus with a controller and plural modules and a method to define a configuration of the image processing machine. U.S. Pat. No. 5,696,893 to Fromherz, et al., incorporated herein by reference, describes a method to model a printing machine specifying a structure model with its physical and software interface and internal resource requirements, and a behavior model to describe capabilities of a component with its description of work units, transformation of work units, timed events, resource allocations, constraints and restrictions.

The print job description describes the paper size and type to be printed on, whether simplex or duplex printing is required, etc. U.S. Pat. No. 5,710,635 to Webster, et al., incorporated herein by reference, describes a representation of a print job or document and how that representation can be transformed into something that the controller can use to print the job. U.S. Pat. No. 5,604,600 to Webster, incorporated herein by reference, describes a representation of a print job or document that is machine-independent and "print-ready." U.S. Pat. No. 5,129,639 to DeHority, incorporated herein by reference, describes a printer configuration control system that compares the print job requirements to the printer capabilities.

In FIG. 1, printing machine 10 includes multiple modules 12, 14, 16, Mark Facility Interface 18 (generically an operator interface) and machine controller 20. For example, a typical machine includes feeder module 12 to provide sheets to feed into the machine, marker module 14 to mark images onto the sheets and stacker module 16 to stack the output sheets. The printing machine is described by a model of the machine (MoM). Each module is characterized by one or more capability, and each capability is characterized by corresponding constraints. Preferably, all of the modules, capabilities and constraints are described and coded using a Component Description Language (CDL). The CDL is made standardized so as to facilitate interchange of different modules between different machines without a need to reprogram the machine controller. Each module includes module description memory 22, preferably a memory having read only memory (ROM) 24 and reprogrammable non-volatile flash memory or erasable programmable read only memory 26. Each module includes interface 28 (e.g., a memory controller or a general processor or microprocessor), called Machine Module Interface (MMI) to control access to memory 22, and each module may include one or more micro switches 30 or sensors to sense the state of the module (e.g., an "out of paper" indicator) coupled to interface 28. Using the CDL, each module is completely described, and the description is stored in module description memory 22 for access by the machine controller.

Figure 2:
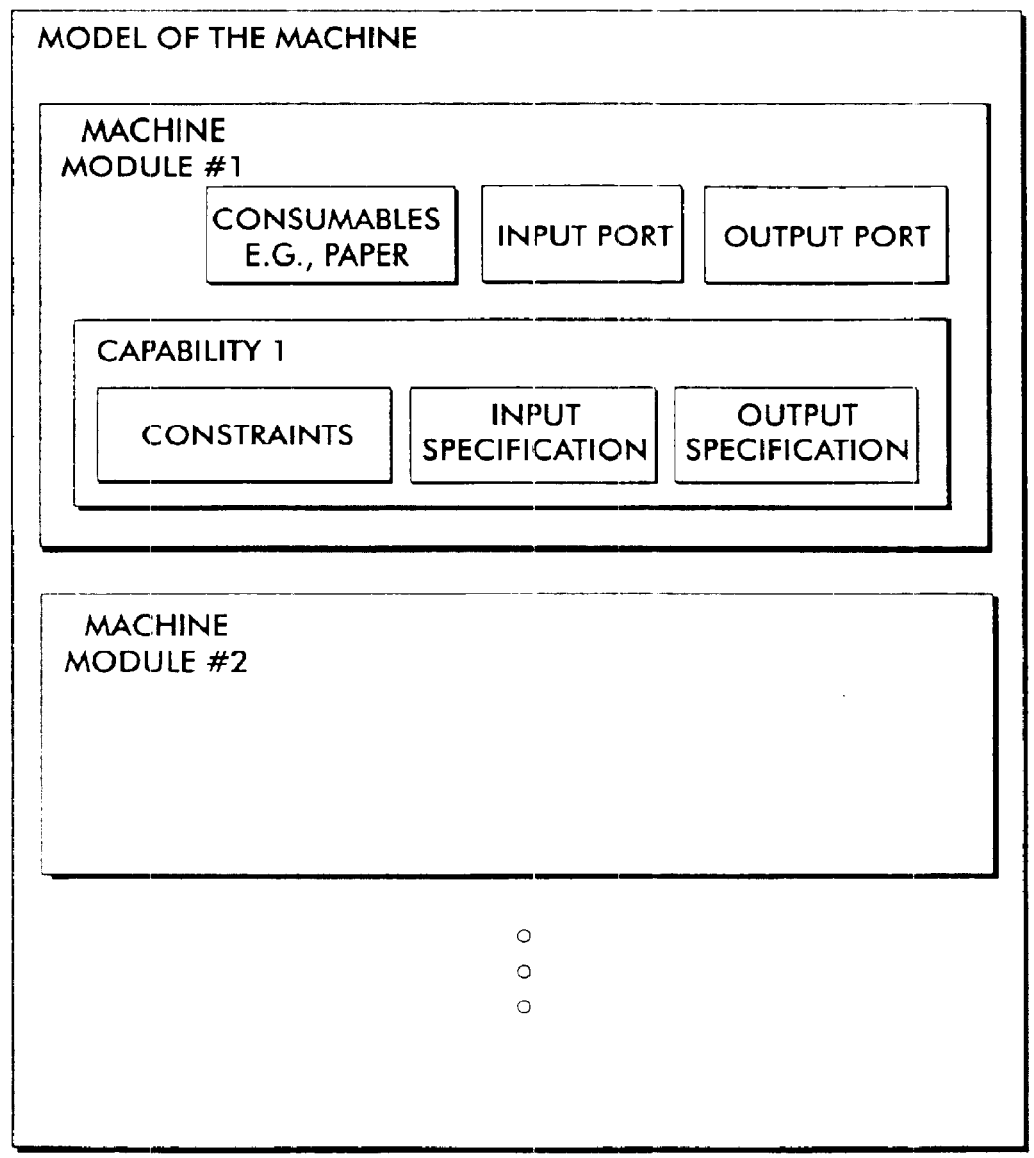
FIG. 2 is a representative machine graph (model of the machine) according to the invention.

In FIG. 2, the model of the machine (MoM) includes machine module #1 and machine module #2. Machine module #1 includes a list of consumables that it can process, a list of input ports and output ports. Machine module #1 also includes a list of capabilities, and each capability includes constraints (e.g., dimensions) on each consumable that can be processed along with a corresponding input and output specification referenced to the input and output ports.

The feeder module typically includes multiple trays, referred to generically as capabilities, to hold the sheets that can be fed by the feeder. For example, the feeder module may include a Tray1 for 8½"×11" sheets, a tray2 for A4 sheets, and an adjustable tray3 to fit sheets of a size between 8½"×13" and 8½"×14". In this exemplary case, the feeder module would have these three capabilities.

Each capability is described in terms of constraints. For example, for tray1 (8½"×11" sheets), memory 22 might have encoded therein the constraints as "DIM.x=850; DIM.y=1100" or an equivalent code. For tray2 (A4 sheets), memory 22 might encode the constraints as "DIM.x=826; DIM.y=1171" or an equivalent code. For adjustable tray3 (either 8½"×13" or 8½"×14" sheets), memory 22 might encode the constraints as "DIM.x=850; 1300<DIM.y<1400" or an equivalent code to indicate the y length is constrained between 13" and 14". A more universal tray might encode the constraint as "DIM.x=850; 1100<DIM.y<1400" or an equivalent code to indicate the y length is constrained between 11" and 14". When constraints are encountered that indicate that the tray dimension is allowed to take on a range of values, machine controller 20 would have to look elsewhere for the final determined value. For example, controller 20 may look to information reported from the flash memory part 26 of the module's description memory 22. When the operator sets a selectable fence in the tray to hold the sheets of the right size in proper alignment, the operator uses another module (a PSIP module) of the printing machine to specify attributes of the sheet (e.g., the sheet size or color). The PSIP module reports these attributes to feeder module 12 via Machine Module Interface 28 (MMI 28). From there, the MMI stores the information in flash memory 26 and informs machine controller 20 about the update of the attributes of the "consumables" (in this case, the paper). Alternatively, micro switch 30 senses the movable fence and indicates the size of the sheets in the tray to MMI 28, and the MMI informs machine controller 20 about the update of the attributes of the "consumables".

A home office may have a printer with one or two trays. A medium size print shop may have a three or four tray feeder module. However, a large print shop may desire more than 20 trays, or 5 or 6 feeder modules, each with several trays. The number of modules in the machine may vary as well as the number of trays in the feeder module. The combinations of sheet sizes, weights and types of sheets (e.g., transparency or paper, paper color, letterhead, tabbed sheets, envelopes, etc) could easily lead to a need for more than 20 trays. Some of the constraints on the tray capabilities, such as sheet size, are inherent characteristics, and these are described in the capability and constraints stored in ROM part 24 of the module's description memory 22.

However, the inherent tray characteristics will not define how the machine operator loads the trays. For example, the color of the paper that is loaded in the tray is not an inherent characteristic of the tray. For these operator imposed constraints on the capability, the operator must personalize the module's constraints. The operator can personalize the sheet weights and types of sheets (e.g., transparency or paper, paper color, letterhead, tabbed sheets, envelopes, etc). The machine operator enters these choices in the machine through another module (a PSIP module) of the printing machine to specify personalizing attributes of the sheets in the trays.

The PSIP is an interface used by the machine operator to personalize the printer, initiate diagnostics, submit jobs, etc. The PSIP module is a software component of the printing system that does processing upstream in the overall workflow of the machine controller. The PSIP module reports the personalizing attributes to feeder module 12 via Machine Module Interface 28 (MMI 28). From there, the MMI stores the information in flash memory 26 and informs machine controller 20 about the update of the attributes of the "consumables".

Similarly, the capabilities and constraints of stacker module 16 will define the patterns of collation and binding or stapling that are available in the stacker module. Capabilities may include specific stacker trays with constraints on their sizes. The stacker module may be capable of stapling in the upper left corner or two times on the left or top margin. Variations may permit the stapling to be done for sheets in landscape or portrait orientation. Advanced capabilities may include other binding techniques, shrink wrapping, various folding formats (as in a newspaper section), etc. The stacker module's capabilities and constraints are described in CDL and stored in the module's description memory.

The capabilities and constraints of marker module 14 will define the printing options that are available from the marker module. For example, the marker module may be capable of printing 8½"×11" or A4 sheets in simplex mode (front side only), duplex mode (front and back arranged for easy reading when bound along a left margin), and inverted duplex mode (front and back with a back sheet inverted for easy reading when bound along a top margin). However, the marker module may be capable of printing "11×17" in simplex mode only. The capabilities of the marker module may include enlarge and reduce features that are defined by constraints on the amount of enlargement or reduction. These capabilities are also described by their constraints using the CDL and stored in the module's description memory.

Each module is connected to machine controller 20 either in a point to point connection or preferably through common bus 32 to which all modules are connected. When the machine is initially powered up, all modules communicate their capabilities and constraints to the controller, and the controller builds a model of the machine. For example, the model for the feeder module might be:

(TRAY1)"DIM.x=850; DIM.y=1100"
(TRAY2)"DIM.x=826; DIM.y=1171"
(TRAY3)"DIM.x=850; 1300<DIM.y<1400"

and stored within the machine controller. Different feeder modules may be used in machines with the same controller since the model of the machine (MoM) is built up each time the machine is powered up. To transfer the contents of the module's description memory to the controller, the controller may poll the several allowable module station addresses and up load the contents if a module station responds. Alternatively, at power up each module may request access to transfer the contents of its description memory, and the controller will resolve conflicting requests and then command the transfer. The total or dynamic model of the machine also includes machine state parameters such as "feeder tray1 empty", marker not ready, or "stacker tray 3 full" that are picked up by sensors or generated by control signals (e.g., ready or not ready) during operation of the individual modules or the machine controller.

Machine controller 20 preferably includes processor 34 (e.g., either a microprocessor or special logic such as may be implemented in one or more ASIC, application specific integrated circuits) and interfaces 36 and 38 to communicate with operator interface 18 and bus 32 respectively. Machine controller 20 also includes memory 40 that may includes ROM, RAM and erasable PROM or flash memory. Memory 40 stores control programs, preferably in the ROM, organized in a plurality of named modules. It will be appreciated by persons skilled in the art that machine controller 20 may be in independent module, a circuit board contained within one of the other modules (e.g., modules 12, 14, 16) or may be a part of a circuit board conveniently implemented anywhere in the machine.

Memory 40 also stores data of one form or another. Permanent data is stored in the ROM and temporary data is stored in the RAM. During the operation of the machine, a model of the machine (MoM) is built and stored, preferably, in the RAM, or part in the RAM and part in an erasable PROM (power up). Parameter data that is a result of personalizing operations of the machine operator is typically stored in the erasable PROM. Furthermore and as described more fully herein, the machine is shipped with a library of policies, preferably, stored in the ROM. However, a program module, called the Strategy Selector, identifies the policies appropriate for the model of the machine, and stores references to the selected policies, preferably, in the erasable PROM.

Persons skilled in the art will appreciate, in light of these teachings, that other configuration of memory 40 may be configured to support this invention. For example, some or all of the program and data may be stored on a CD-ROM or a magnetic floppy disk, transferred onto a magnetic disk internal to machine controller 20 and from there loaded in RAM.

A Strategy Selector is a software module that includes conditional statements (e.g., if-then-else statements) that conditionally add or delete other modules and policies as further discussed herein. For example, in the power up scheduling process (e.g., step S42, FIG. 8), a Strategy Selector selects a Model Traverser and selects configuration policies from a library of policies based on the configuration and environment of a target machine. On the other hand, at the selection time scheduling process (e.g., step S51, FIG. 9), a Strategy Selector selects a Store Traverser and selects selection policies. A single Strategy Selector may be used to select both (i) a Model Traverser and configuration policies for use at power up and (ii) a Store Traverser and selection policies at power up for use at selection time.

One might think of the Strategy Selector as directing a memory loader to load, for example, the Model Traverser (a software module) and configuration policies (also software modules made of if-then-else statements) into a memory. The Model Traverser is loaded starting at a specific memory location and continuing for a specific number of bytes. Similarly, each configuration policy is loaded at a specific memory location and continuing for a specific number of bytes. The memory loader function of the Strategy Selector (e.g., a utility software module) keeps track of where the loaded modules are stored, and the Strategy Selector configures the Model Traverser with the necessary locations so that the Model Traverser knows where the configuration policies and the Model of the Machine (MoM) are stored. In this way the Model Traverser can traverse the Model of the Machine based on the configuration policies. Similar loading procedures are used to load the Store Traverser and the selection policies.

Different embodiments of the invention cooperate with a monitor to obtain information with which to adapt the scheduler to the machine's current state. A monitor is a hardware element and/or a software module that monitors the machine state (e.g., marker not ready), the machine performance (e.g., elapsed time to first copy out) and/or a machine environment (i.e., premium customer job printing). When the monitor is a software module, an embodiment of the invention uses the Strategy Selector to select a monitor module and monitor policies as described herein, or other modules.

Then, while still in the power up sequence, the machine controller uses the Model Traverser to process the model of the machine in accordance with the selected configuration policies to prepare a list of valid itineraries. At a later time, when a job description is received, the machine controller uses the Store Traverser to search the list of valid itineraries based on selection policies and the print job description to determine an itinerary that includes the specific modules and capabilities that will be able to process the print job on the target machine.

In general, a Traverser is a module of the program modules that controls machine controller 20 to search for one or more valid itineraries. The present invention uses several types of Traversers that are included in a library, for example, stored in memory 40 (FIG. 1). One type of Traverser is a Model Traverser used at power up. The Model Traverser may be implemented using several types of algorithms as discussed herein, may be referred to as a power up Traverser (or configuration Traverser), and is used to develop a list of all possible itineraries based on the model of the machine (MoM), and then to determine which itineraries are valid and which itineraries are invalid based on configuration policies and the MoM.

In a typical power up version (i.e., a configuration version), the Model Traverser loops through all combinations and permutations of modules and their capabilities that are allowed by their constraints and interconnections to specify a different possible itinerary (i.e., unique combination of modules and capabilities) for each cycle. In each cycle, the Model Traverser uses an Itinerary Validator (discussed herein) to determine whether the possible itinerary is valid or invalid.

In a preferred version, the Model Traverser is separable from the algorithm that is used to actually do the traversing. This separation allows for easy substitution of different algorithms into the system as further described herein. The Model Traverser is configured by the Strategy Selector (discussed herein) to use or include a particular search algorithm, yet the Model Traverser itself is abstracted from dependence on any particular algorithm.

One might think of the Strategy Selector as directing a memory loader to load, for example, the Model Traverser (a software module abstracted from dependence on any particular algorithm) and a model search algorithm (also a software module) into a memory. The Model Traverser is loaded starting at a specific memory location and continuing for a specific number of bytes, and the model search algorithm is loaded at a specific memory location and continuing for a specific number of bytes. The memory loader function of the Strategy Selector (e.g., a utility software module) keeps track of where the loaded modules are stored, and the Strategy Selector configures the Model Traverser with the necessary locations so that the Model Traverser knows where the model search algorithm, the configuration policies and the Model of the Machine (MoM) are stored. In this way the Model Traverser can be abstracted from dependence on any particular search algorithm while it still can traverse the Model of the Machine based on the configuration policies using a model search algorithm. Similar loading procedures are used to load the Store Traverser and the selection policies.

A model search algorithm is preferably written to traverse one data member (e.g., the MoM) based on another data member (e.g., the configuration policies). Similarly, a store search algorithm is preferably written to traverse one data member (e.g., a stored list of valid itineraries) based on another data member (e.g., the selection policies and a job description). In this way the Strategy Selector configures a Traverser, an associated algorithm and first and second data elements so that the Traverser is abstracted from dependence on any particular algorithm. To achieve the best expected performance of a Traverser, the Traverser is adapted to the MoM by selecting the most suitable algorithm from among the substitutable algorithms in a library.

In an alternative version, an algorithm may include an algorithm shell and a plurality of substitutable algorithm fragments (e.g., substitutable subroutines). The Strategy Selector selects the algorithm shell and a set of algorithm fragments based on a strategy design pattern (discussed herein) as the algorithm for the Traverser.

Itineraries may be valid or invalid. For example, if the marker module is capable of marking 11" by 17" sheets in simplex mode only, then an itinerary that specifies feeding an 11" by 17" sheet through a marker module to be marked in duplex mode would be an invalid itinerary.

The Model Traverser searches all possible itineraries and stores all of the valid itineraries for later use.

At the time a print job is run (i.e., selection time), the machine controller of the printing machine matches job descriptions to print itineraries, where a print itinerary for a sheet is a schedule of the required modules, together with the required capabilities of each module, that are necessary to process the sheet. For example, a particular itinerary simplex mode through the marker module, and delivered into a tray of the stacker module without binding. Another itinerary may specify that a sheet is to be picked from tray2 of the feeder module, processed in duplex mode through the marker module, and delivered into a tray of the stacker module with the upper left corner stapled at the end of the print job. The task of matching a job description to an itinerary is performed by a Store Traverser.

A Store Traverser analyses the job description (or assembly tree) and search through the stored list of valid itineraries to select an itinerary that is capable of processing the print job description.

For example, a printing machine includes a feeder that can feed either A4 or A5 sized sheets, a marker that can simplex print on either A4 or A5 sheets, and a stacker that can stack A4 or A5 sheets (i.e. a feeder with a FeedA4 and a FeedA5 capability, a marker with a SimplexA4 and a SimplexA5 capability, and a stacker with a StackA4 and a StackA5 capability). The Model Traverser at power up will find two itineraries:

1. FeedA4-SimplexA4-StackA4; and
2. FeedA5-SimplexA5-StackA5.

The Model Traverser will have ruled out other itineraries such as FeedA4-SimplexA5-StackA4, since it can tell (due to the descriptions of the capabilities themselves in the MoM) that the FeedA4 capability outputs A4 sized paper, but that the SimplexA5 capability can accept only A5 sheets.

A job description is a machine independent specification of the sheets desired to be printed. A system module (called a Mark Facility Interface or MFI) upstream of machine controller 20 reformulates user specified job attributes (e.g., landscape mode, 2 copies, blue cover sheet, etc.) of the job description into an assembly tree. The assembly tree is a machine independent description that is input into machine controller 20 from the MFI. Job descriptions and assembly trees are described in U.S. Pat. Nos. 5,604,600 and 5,710,635, incorporated herein by reference. In its simplest form, the parameters of the job description are sent to the machine controller via the MFI. For example, one job might specify A4 sheets to be printed in simplex mode and stacked and stapled.

To execute a print job, it is first necessary to find an itinerary that is capable of processing the job description. When a job comes to the machine controller, and the first requested sheet is, for example, an A4 sheet, the machine controller uses a Store Traverser to cycle through each stored itinerary, and in each cycle, the Store Traverser uses an Itinerary Validator to check the currently selected itinerary against selection policies and the job description to see if it can produce the desired A4 sheet.

An Itinerary Validator is a module that iterates over each policy while checking the currently selected itinerary against the policy. The Itinerary Validator is thus supported by one or more policies. The Itinerary Validator may be used by the Model Traverser, the Store Traverser or both. For example, the Itinerary Validator may try the FeedA5-SimplexA5-StackA5 itinerary first. One policy that the validator may have (call it Policy1) checks to see if the requested sheet properties match (i.e., 'unify' with) the sheet properties of the sheet that can be produced by the itinerary. Policy1 checks the output description of the FeedA5-SimplexA5-StackA5 itinerary, and matches it against the sheet description of the requested sheet. The result of the check with Policy 1 is that some of the properties don't match (i.e. the itinerary's outputted sheet's size will be A5, whereas the requested sheet's property is A4). So this itinerary does not pass policy 1, and therefore is not selected.

The Store Traverser then proceeds to check the next itinerary, itinerary2 (FeedA4-SimplexA4-StackA4) using the Itinerary Validator, and itinerary2 passes Policy1. There may be another policy (policy2) that the Itinerary Validator has to consider, which may specify that the itinerry's capabilities must all be in a 'ready' state. If policy2 also passes, then itinerary2 is selected as the itinerary that will produce the requested sheet.

A selection policy is a criteria that a selected itinerary must satisfy to process the job description. The policy is generally in the form of if-then-else statements. A policy uses its if-then-else statements to make a determination about the machine (or the model of the machine or a job to process). For example, a policy may be used to determine whether the machine has the capabilities and constraints required to execute a desired function. A policy may be used to interpret whether a capability of a module of the machine is in a ready state. Alternatively, a policy may be used to interpret whether a capability of a module of the machine exists (e.g., does the feeder module include an 8½"×11" tray with paper in it?). The policy may incorporate subordinate policies that are broken down in the same way that programs are broken down into subroutines.

These policies can vary from printing machine to printing machine and from time to time within the same printing machine. Each printing machine is shipped with a "library" of potential policies to choose from. Upon power-up, a Strategy Selector will figure out which policies make sense for this particular machine configuration in light of the model of the machine. For example, the Strategy Selector may select different policies depending on whether the number of machine modules is greater than a predetermined number (e.g., 7) as discussed further herein. The Strategy Selector is a part of the machine controller that configures the Itinerary Validator to iterate over only the selected policies.

Not only can the policies be configured based on the machine configuration, but a separate monitor module can monitor one or more operations of the machine and can request the Strategy Selector to dynamically swap policies in and out of the selected configuration based on a detection of the machine state, monitored performance and operating environment. The monitor module uses information that is part of the dynamic model of the machine. When the machine state changes, the monitor module requests the Strategy Selector to reconfigure policies based on the new dynamic model of the machine. In this way, the policies can be dynamically swapped in and out, on-the-fly, during processing so that while processing one job, the Itinerary Validator has a policyA that says "itinerary must end at stackerA", but when processing the next job, policyA is swapped out by the Strategy Selector, and policyB is added instead, which says "itinerary must end at stackerB". The monitor itself may use supporting monitor policies that are selected by the Strategy Selector.

For example, when a diagnostics monitor has been selected by a Strategy Selector and is monitoring the machine's performance, and it is learned that the simplex capability in Marker2 is producing poor image quality today, the diagnostics monitor tells the Strategy Selector to add policy32, which says to ignore Marker2. In another example, a job monitor is a module that has information about which customers have paid a premium for their prints.

Figure 3:
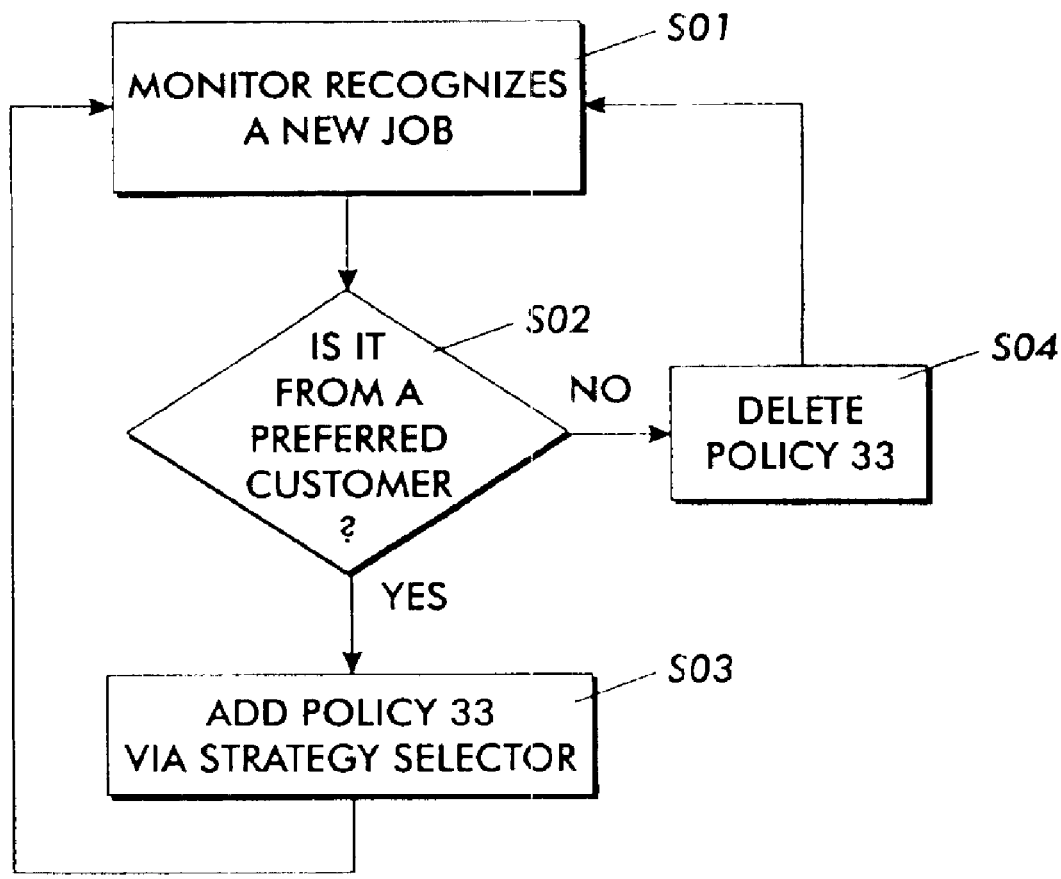
FIG. 3 is a flow chart of a monitor according to the invention.

In S02 of FIG. 3, the job monitor looks to see if this is a "preferred customer" job as jobs come in. If so, at step S03, the job monitor asks the Strategy Selector to add policy33, which ensures that the preferred customer's job is printed on Marker4, which has better image quality than the other markers. When regular customer jobs come in, at step S04, the job monitor asks the Strategy Selector to remove this "premium" policy, so that the scheduler resumes printing from the lower-cost marker.

In general, using a monitor permits the scheduler to learn and adapt to a particular operating environment and adjust its processing accordingly. The monitor module records and remembers monitored situations (e.g., the machine state, the machine performance and/or a machine environment) and the processing configuration (e.g., the configuration and selection policies that are selected from time to time).

For example, the monitor measures and records the time it takes to print certain sheets. Over time, selection policies will cause the Store Traverser to select different itineraries to process the same sheet type (e.g., due to a policy preference to select printer module capabilities that are ready). The monitor measures and records the time it takes to print the same sheet type using the different itineraries. After a time, there is developed a statistical relationship between the itineraries and the time it takes to print a sheet using the itinerary. This statistical relationship is recorded as a selection policy that favors the faster itinerary. When recording the new policy, the monitor module requests the Strategy Selector to add this policy to the active selection policies.

In an alternative example, a hardware monitor observes bad image quality from a marker module (e.g., marker4), but only on certain jobs (e.g., duplex jobs). A monitor module records this observation as a selection policy that disfavors selection of marker4 for processing duplex jobs. In this way the scheduler can notice and remember what the past performance has been and then adapt itself to better achieve performance goals.

Figure 4:
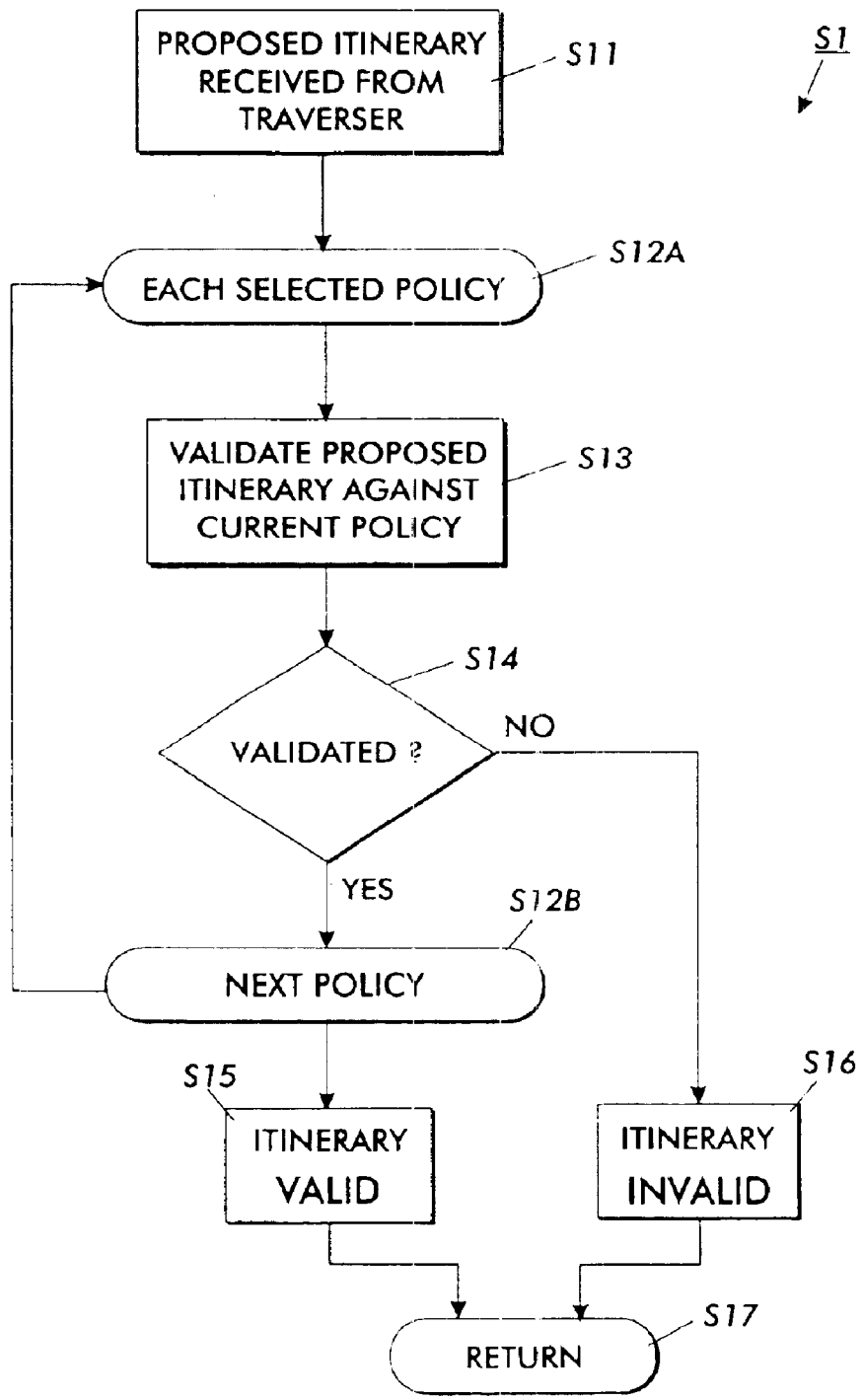
FIG. 4 is a flow chart of a itinerary validation process of the invention.

In greater detail, the Itinerary Validator is a module of the program modules that control machine controller 20, this module being for iterating over each selected policy while checking a proposed itinerary (or candidate itinerary) against the policy or policies. The selected policies are the policies selected by the Strategy Selector from the library of possible policies as described further herein. In FIG. 4, Itinerary Validator S1 includes steps S11 through S17. In step S11, the validator inputs a proposed itinerary to be checked for conformance with the selected policies. In steps S12A and S12B, the validator forms a loop around steps S13 and S14 to cycle through each selected policy. In step S13, the validator uses the if-then-else statements of the current policy to evaluate whether the proposed itinerary can be processed in the machine based on the description contained in the model of the machine (MoM). In step S14, the validator branches to continue evaluating the next policy if the evaluation determines that the itinerary is valid for the MoM and conforms with the current policy. However, if the evaluation determines that the itinerary is invalid for the MoM and/or does not conform with the current policy, the validator branches to step S16 where it reports an invalid itinerary before returning to a calling module in step S17. However, if the validator completes looping in steps S12A and S12B through all selected policies, in step S15, the validator reports a valid itinerary and returns to a calling module in step S17. Therefore, Itinerary Validator S1 provides a means to check the validity of a possible itinerary against all selected policies.

A Traverser, either the Model Traverser or the Store Traverser, is a module of the program modules that control machine controller 20. The Model Traverser is for iterating over all possible itineraries and storing a list of itineraries that conforms with both the model of the machine and the selected configuration policies. The Store Traverser is for iterating over all stored valid itineraries finding a valid itinerary that conforms with both the selection policies and the job description.

Figure 5:
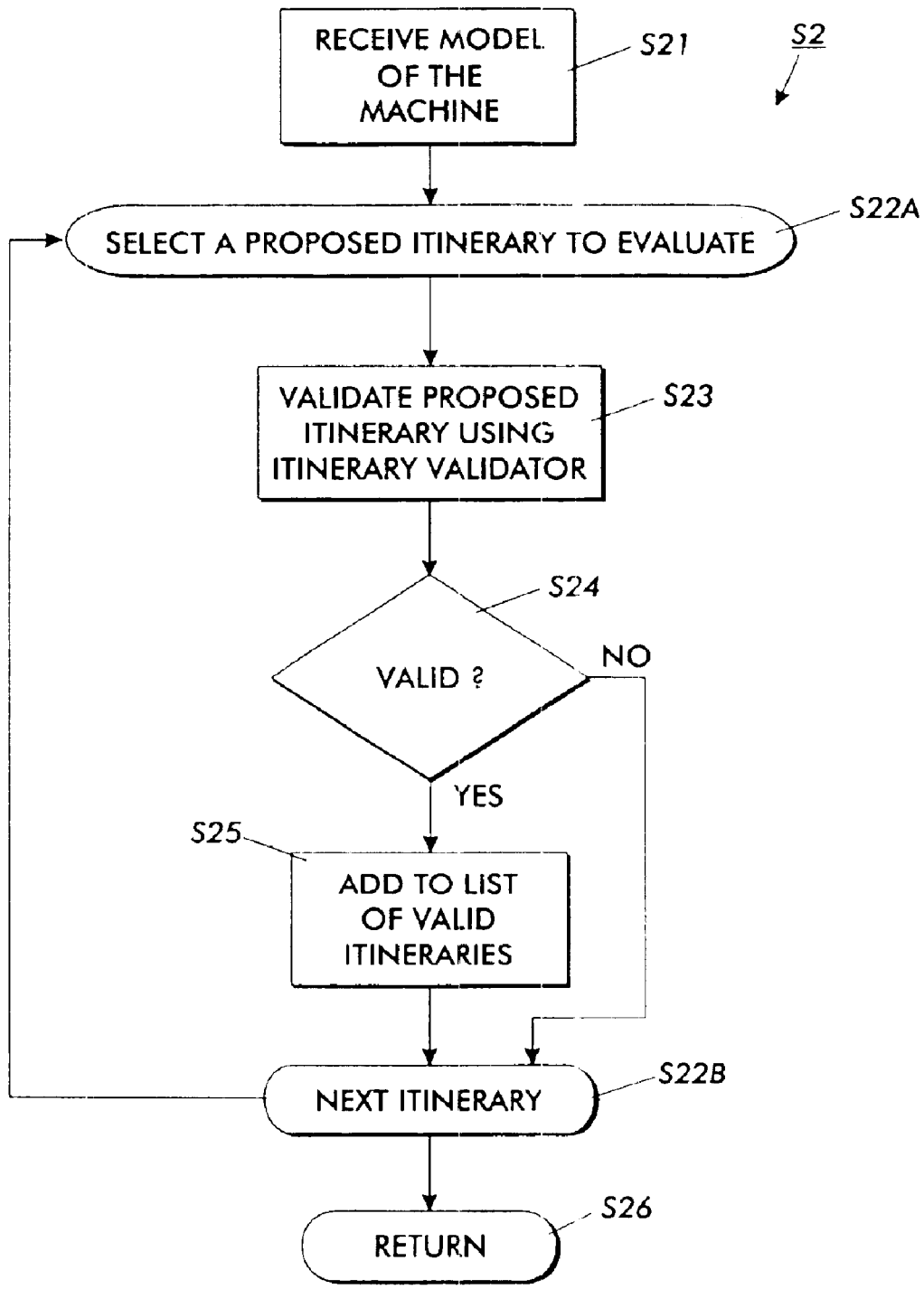
FIG. 5 is a flow chart of a model traversal process of the invention.

In FIG. 5, Model Traverser S2 includes steps S21 through S26. In step S21, the Model Traverser receives, inputs or otherwise regards the model of the machine. In steps S22A and S22B, the Model Traverser forms a loop around steps S23, S24 and S25 to cycle through each possible itinerary.

For the Model Traverser, there are many possible algorithms to generate a set of possible itineraries. The backtrack algorithm is described herein as an example. In step S23, the Model Traverser uses Itinerary Validator S1 to evaluate whether each proposed itinerary can be processed in the machine based on the description contained in the model of the machine (MoM). In step S24, the Model Traverser branches to step S22B to continue evaluating the next possible itinerary if Itinerary Validator S1 determines that the itinerary is invalid for the MoM and/or does not conform with all selected policies. However, if Itinerary Validator S1 determines that the itinerary is valid for the MoM and conforms with all selected policies, the Model Traverser branches to step S25 where it adds the newly evaluated itinerary to the list of valid itineraries before continuing to evaluate the next possible itinerary at step S22B and from there to step S22A. After all possible itineraries have been evaluated, the traverser returns to a calling module in step S26. Thus, Model Traverser S2 provides a means to develop a list of all valid itineraries based on the model of the machine and the selected policies.

Figure 6:
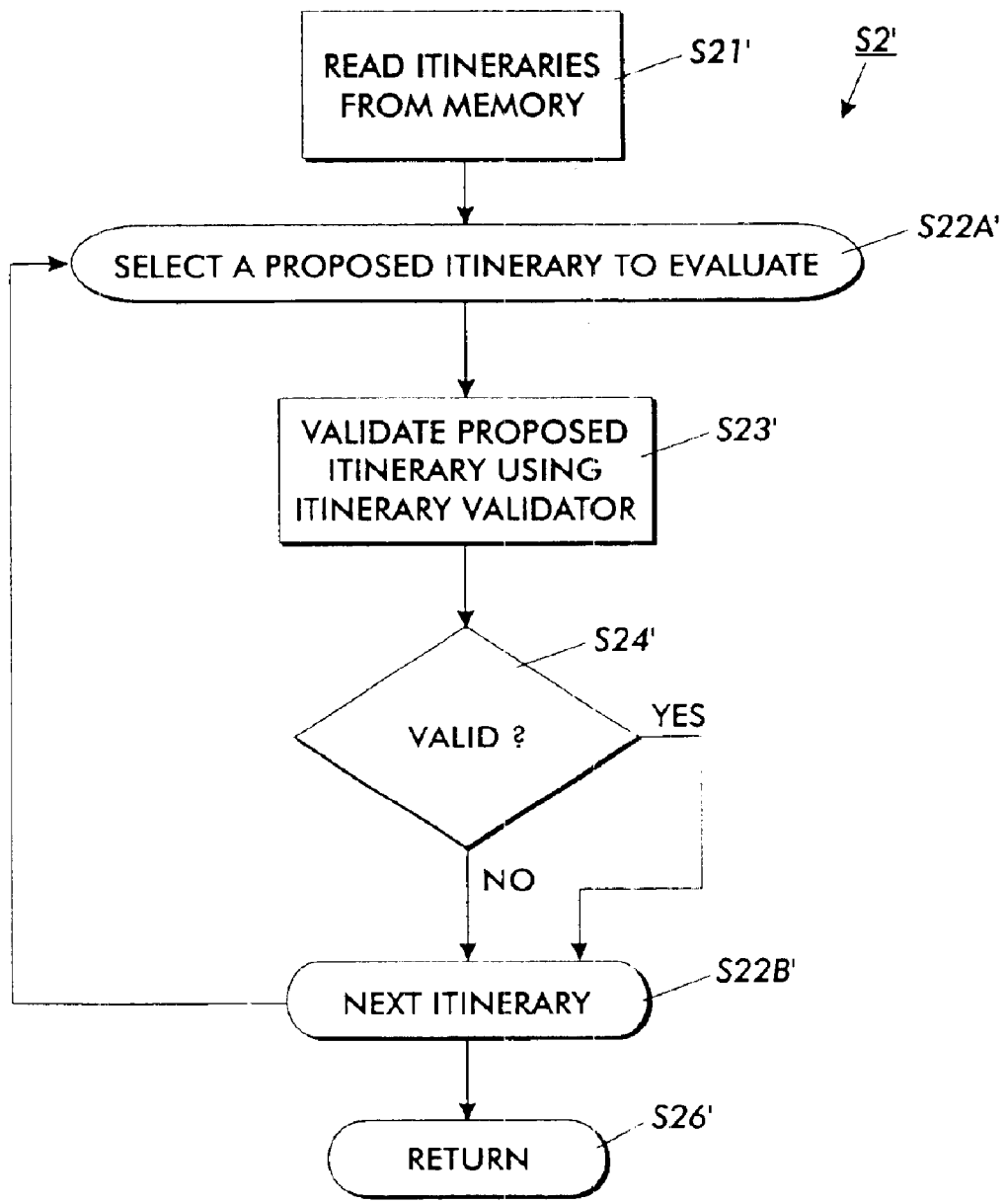
FIG. 6 is a flow chart of a store traversal process of the invention.

In FIG. 6, Store Traverser S2' includes steps S21' through S24' and S26'. In step S21', the Store Traverser receives, inputs or otherwise regards the list of valid itineraries. In steps S22A' and S22B', the Store Traverser forms a loop around steps S23' and S24' to cycle through each stored itinerary.

The Store Traverser operation may vary depending on the order in which itineraries from the list of valid itineraries are to be searched. In step S23', the Store Traverser uses Itinerary Validator S1 to evaluate whether each stored itinerary can process the job description. In step S24', the traverser branches to step S22B' to continue evaluating the next possible itinerary if Itinerary Valadator S1 determines that the itinerary cannot process the job description and/or does not conform with all selected policies. However, if Itinerary Validator S1 determines that the itinerary can process the job description and conforms with all selected policies, the Store Traverser declares that the itinerary is found, ends the loop set up in steps S22A' and S22B', branches to step S22B' where it returns to a calling module in step S26'. Thus, Store Traverser S2' provides a means to find a valid itinerary that can process the job description based on the selection policies.

Figure 14:
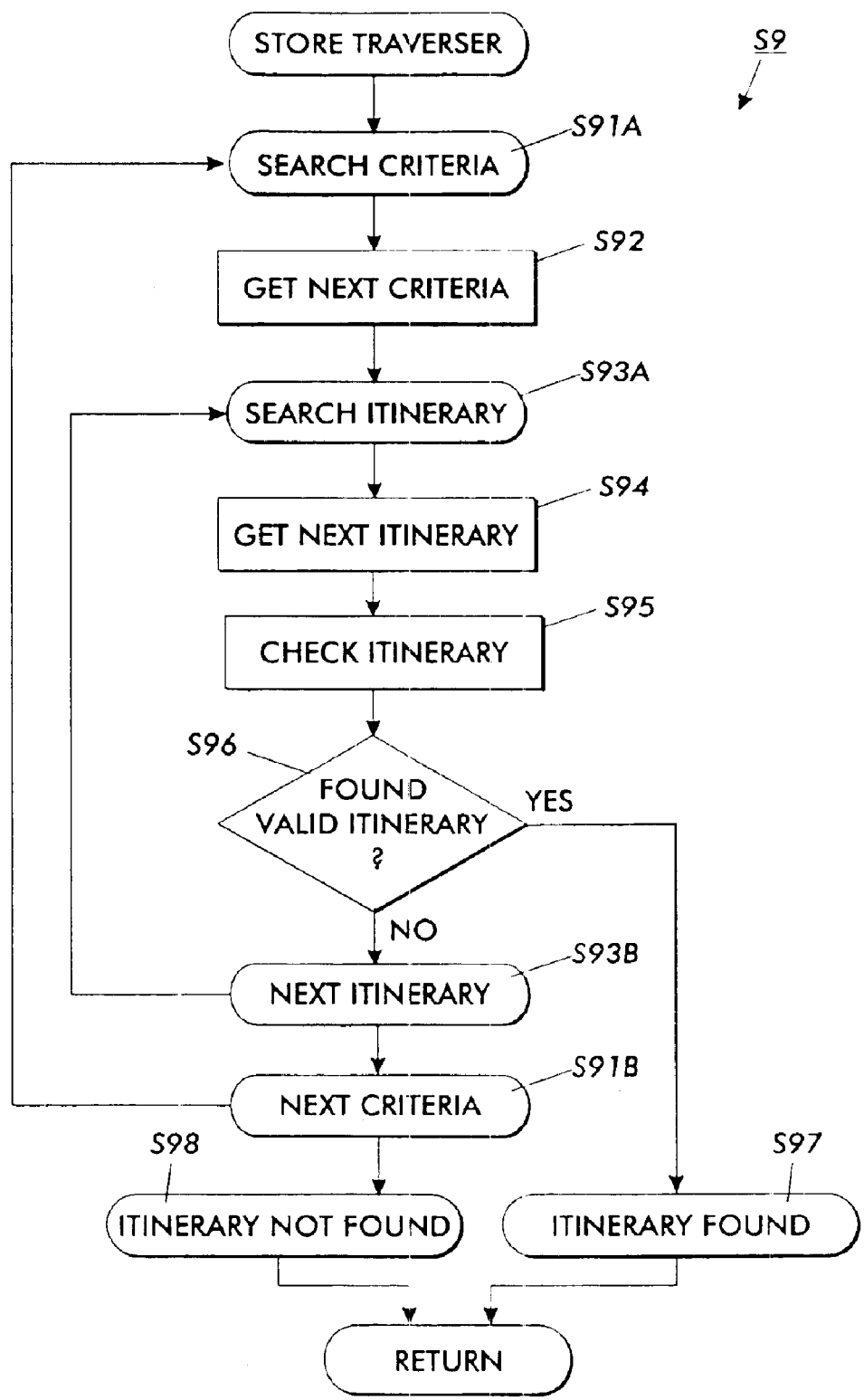
FIG. 14 is a flow chart of a Store Traverser with algorithm fragments that are configurable according to a strategy design pattern.

An alternative Store Traverser is described with respect to FIG. 14, where the Store Traverser has selectable algorithm fragments that are configured according to strategy design patterns.

The Strategy Selector is a module of the program modules that control machine controller 20, this module being for selecting the Model Traverser, the Store Traverser, any associated algorithms and design pattern tables (as described herein), and policies from the policy library that are applicable to the machine as presently configured, or according to the machine's operating environment.

Figure 7:
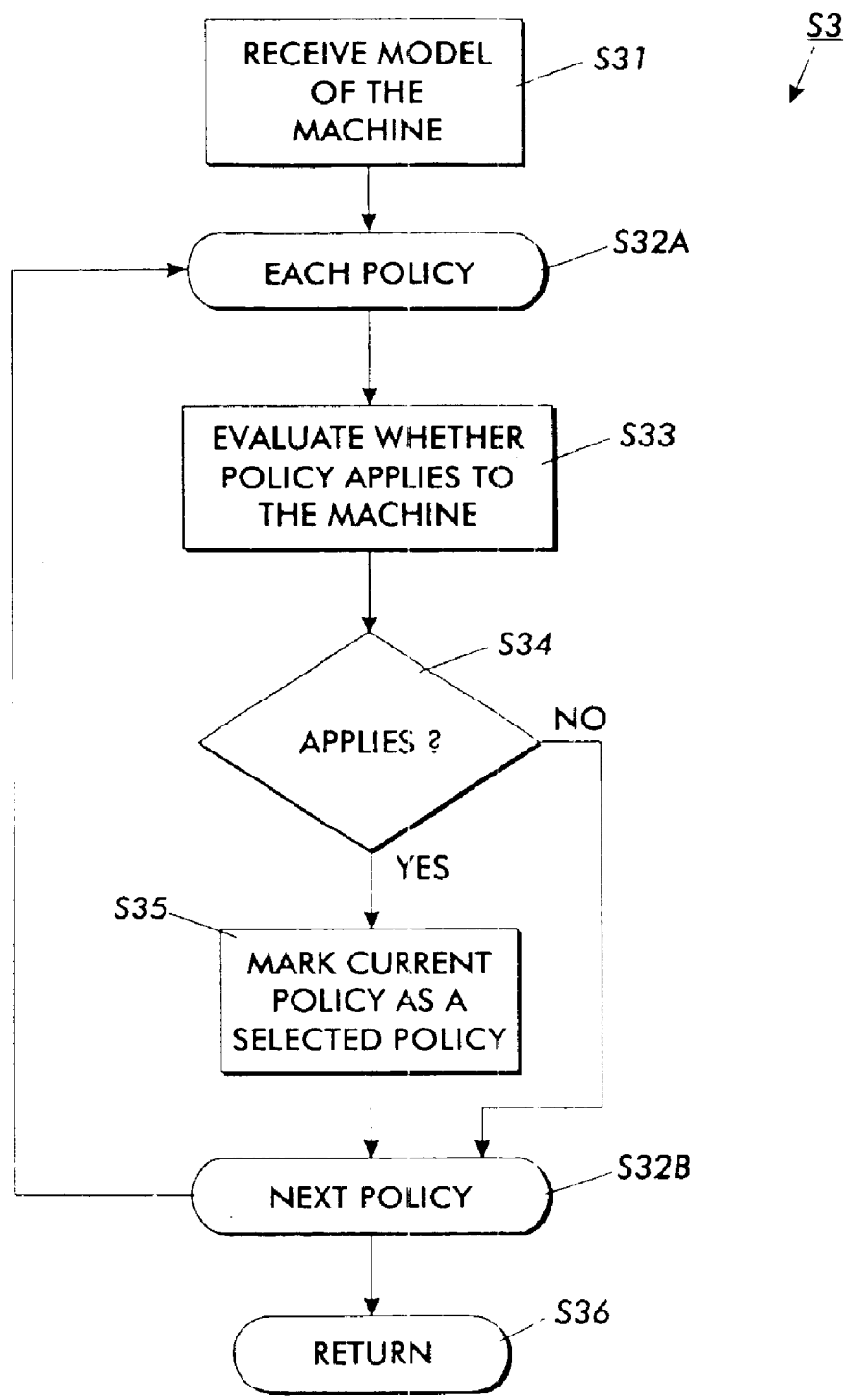
FIG. 7 is a flow chart of a strategy selection process of the invention.

In FIG. 7, Strategy Selector S3 includes steps S31 through S36. In step S31, the strategy selector receives inputs or otherwise regards the model of the machine and all policies in the library of policies. The Strategy Selector knows everything there is to know about the machine. It knows whether the machine is in a power up phase. It knows whether an operator has opened a tray of a feeder module to refill it with paper. It knows the location, within a path specified by an itinerary, of a sheet being currently processed. In steps S32A and S32B, the strategy selector forms a loop around steps S33, S34 and S35 to cycle through each policy in the library of policies (and each of a number of algorithms, such as traverser algorithms, stored in a similar library). The library may be stored in the ROM part of memory 40 (FIG. 1), and Strategy Selector selects a subset of policies and algorithms and stores this subset in the RAM part of memory 40. Preferably, only an indirect address vector is stored in RAM, the address vector pointing to the selected policy or algorithm stored in ROM. In step S33, the strategy selector evaluates whether each policy or algorithm in the library applies to the machine based on the description contained in the model of the machine (MoM) and the machine's current environment.

For example, it may be and often is desirable for different traverser algorithms to be used depending on whether the machine is in a configuration phase at power up or a selection phase at run time of a current job. In the configuration phase, it is desirable to use one of the Model Traversers with a version of a backtrack traverser algorithm and certain policies (e.g., policy1 and policy3). However, in the selection phase it may be desirable to use a Store Traverser algorithm and different policies (e.g., policy23 and policy 44).

The Strategy Selector is a software module that chooses the algorithms and policies to use based on its knowledge about what's going on at the moment. For the above described example, the Strategy Selector may be written as:

if (configuration_phase),
        add BacktrackTraverser
        add policy1
        add policy3
    else if (selection_phase),
        add StoreTraverser
        add policy23
        add policy 44

Extensions of this exemplary Strategy Selector make use of statistical information that has been or is gathered about machine configuration performance. For example, information about how long it takes to do selection on various sized machine configurations, various capabilities, etc. may be developed and stored in ROM before the printing machine is shipped, or information may be collected during actual use of the machine and stored in an erasable PROM. In this case, the Strategy Selector will also include if-then statements that take advantage of this metrics knowledge. For the above described example, the Strategy Selector may be written as:

if (number of machine modules in MoM>7) and (configuration_phase),
        add Combined_Traverser
        add policy1B
    else if (number of machine Module<=7) and (configuration_phase),
        add BacktrackTraverser
        add policy1
        add policy3

This Strategy Selector makes use of the fact that if a machine configuration has more than 7 machine modules, it is known that it takes too long, or takes up too much memory to search through and store "all" of the possible itineraries. Rather, a "combined" traverser (another traverser algorithm discussed herein), that identifies and stores "some" of the possible itineraries, is selected for the configuration phase. Then, for the selection phase, a Store Traverser is used to search the stored list of valid itineraries, but if no valid itinerary is found, then a version of the Backtrack Traverser algorithm is selected so that the Traverser can search for more valid itineraries that are possible according to the model of the machine. Also, there may be some policies that have been "optimized" for certain machine configurations, and those policies can be used when the specific kind of configuration is encountered.

In step S34 (FIG. 7), the Strategy Selector branches to step S32B to continue evaluating the next policy if the Strategy Selector determines that the current policy does not apply. However, if the Strategy Selector determines that the policy applies, the Strategy Selector branches to step S35 where it adds the newly evaluated policy to the list of selected policies before continuing to evaluate the next policy from the library of policies at step S32B and from there to step S32A. After all policies in the library have been evaluated, the Strategy Selector returns to a calling module in step S36. Thus, Strategy Selector S3 provides a means to select policies from the library of policies and to select traversal algorithms or other algorithms that apply to the present machine.

Figure 8:
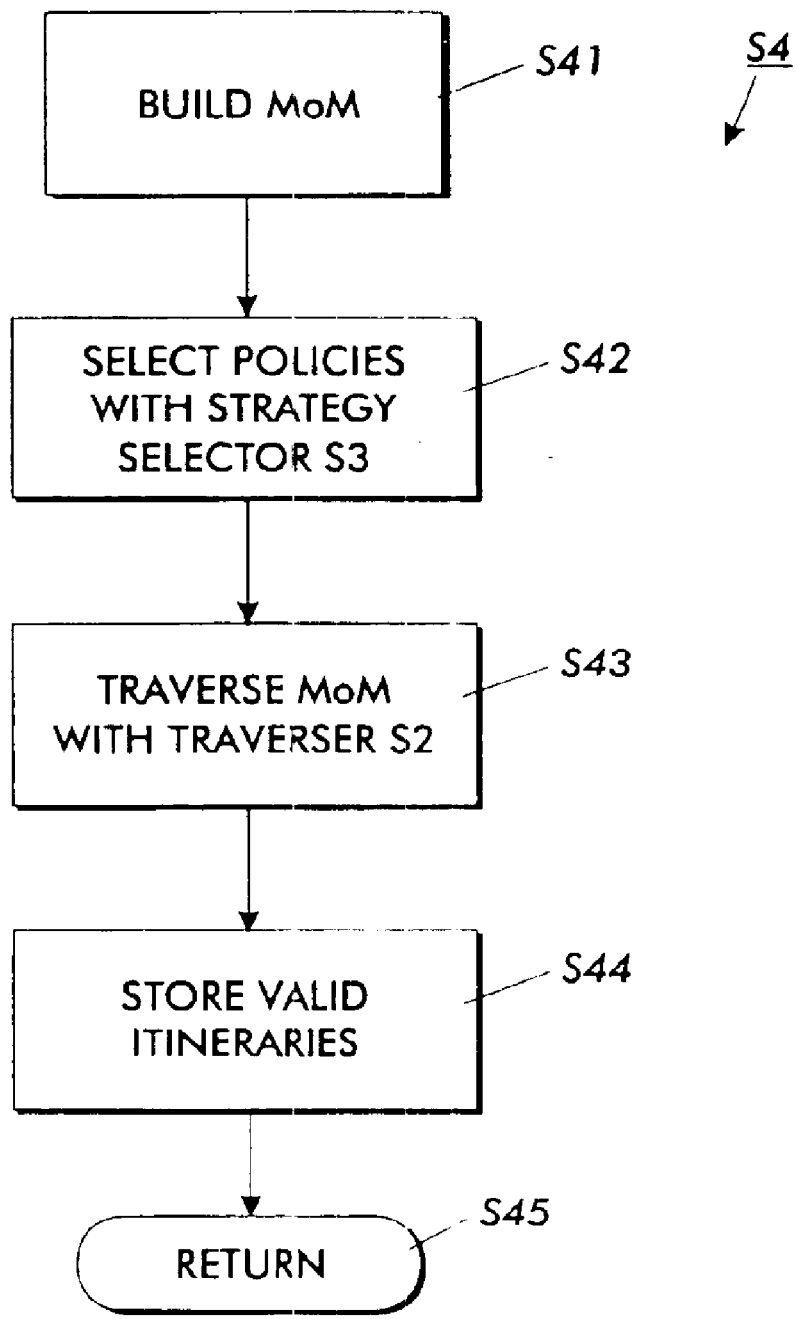
FIG. 8 is a flow chart of a power up sequence of the invention.

At power up, machine 10 (FIG. 1) executes a sequence of power up modules. In FIG. 8, power up sequencer S4 includes steps S41 through S45. In step S41, power up sequencer reads the module description memories and builds the model of the machine. In step S42, power up sequencer selects policies and traverser algorithms and/or other algorithms that apply to the machine using Strategy Selector S3. This will include the selection of the power up Model Traverser, and may include the selection of the Store Traverser. In step S43, power up sequencer traverses the model of the machine using Traverser S2 to prepare a list of valid itineraries, and in step S44, power up sequencer stores the valid itineraries before returning to a calling module in step S45. Thus, power up sequencer S4 provides a means for machine controller 20 (FIG. 1) to develop a list of valid itineraries during the power up sequence.

Figure 9:
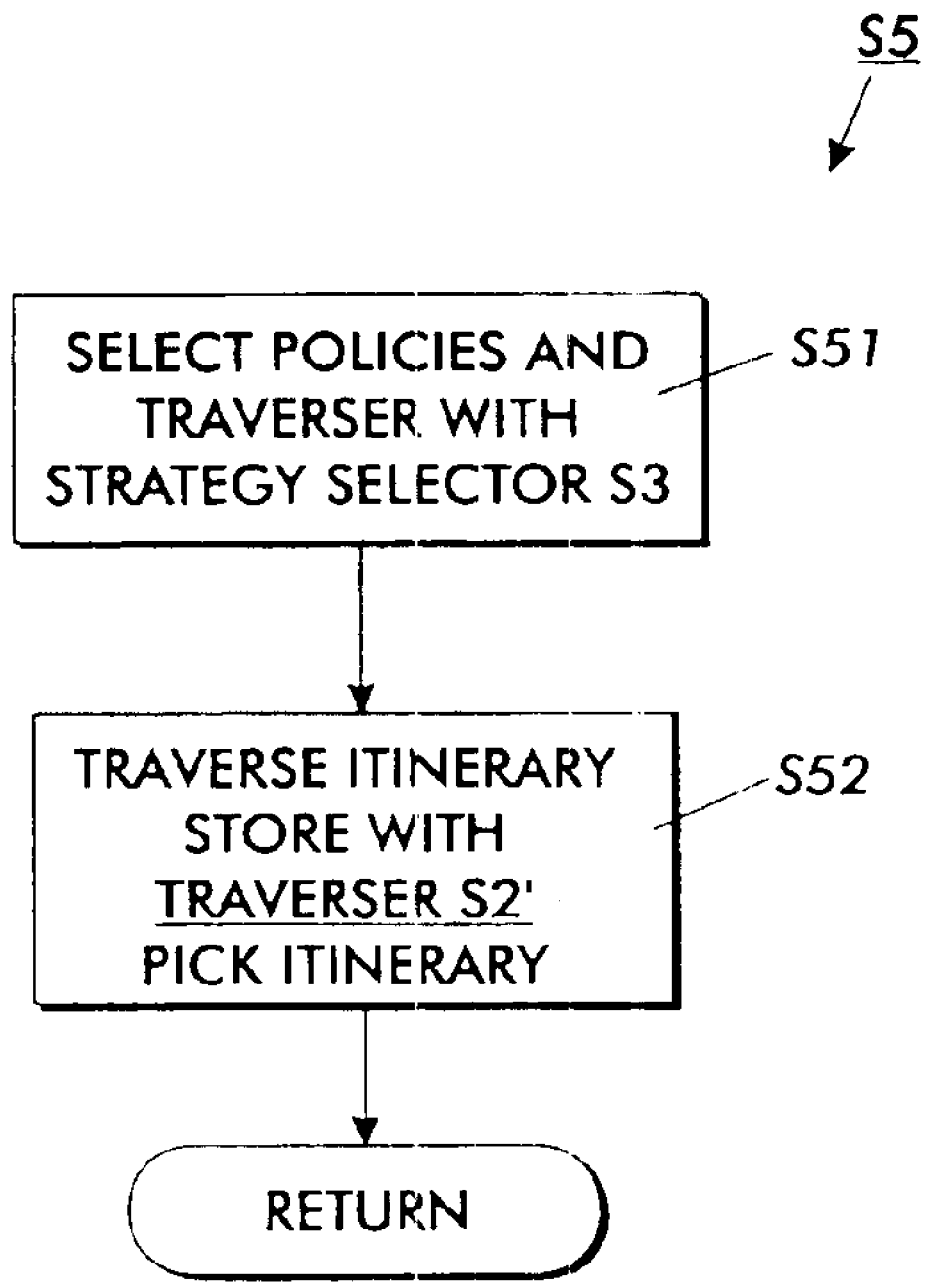
FIG. 9 is a flow chart of a selection time sequence of the invention.

At a time when a job is to be printed, machine 10 (FIG. 1) executes a sequence of selection time modules. In FIG. 9, selection time sequencer S5 includes steps S51 through S52. In step S51, the selection time sequencer selects a Store Traverser (if not selected during the power up time) and policies that apply to the machine using Strategy Selector S3. For example, the Strategy Selector S3 will select a Store Traverser that selects itineraries from the list of valid itineraries previously stored, and selects policies appropriate for validating an itinerary against the current job description. In step S52, the selection time sequencer uses the Store Traverser to traverse each itinerary stored in the list of valid itineraries, and the Store Traverser uses an Itinerary Validator to verify whether the current itinerary can process the job description. When the Itinerary Validator verifies that a particular itinerary can process the job description, the Store Traverser stops, and the selected itinerary is then available for timing.

A Store Traverser searches the list of valid itineraries for an itinerary that can process the job description. The Strategy Selector has previously selected the Store Traverser and the selection policies that supports an Itinerary Validator that in turn supports the selected Store Traverser. The Store Traverser loops through the stored valid itineraries to select a possible itinerary and then uses the Itinerary Validator to check whether the job description (or assembly tree) can be processed by the selected itinerary. If not, a next stored itinerary is tried. When the Itinerary Validator determines, based on all of the selected policies, that the job description (or assembly tree) can be processed by an itinerary, the itinerary is selected and then further passed along to another system component to be timed. The object of the scheduler is to find a valid itinerary that can process a print job and to time that itinerary for later execution by the machine.

It may happen that there are two or more itineraries that can process the job description. In such a case, the traverser selects the first itinerary found. If it happens that there is some benefit to using one itinerary over another, both capable of processing the print job, the benefit is characterized and the characterized parameters included as conditional statements in an additional policy statement. Then, only the preferred itinerary will be selected because of the additional policy statement.

Alternatively, the selection policies can distinguish between hard and soft policies. Hard policies are "must meet" policies, and soft policies are "desired" policies. For example a soft policy might be "print on 8½"×11" paper if available, but if not, print on the next available larger size" or "print on white or buff, but prefer to print on white if available". In this type of situation, the Traverser is looking for more than just the "must have" hard policies; the Traverser is also looking to satisfy "preferred" policies.

The use of hard and soft policies makes capability selection a more complex optimization problem. Freuder, E. C. and Wallace, R. "Partial Constraint Satisfaction", *Artificial Intelligence*, Vol. 58, pp 21–70, 1992, incorporated herein by reference, describes a survey of various algorithms that can partially solve a problem when a "good enough" solution is acceptable, and also provides experimental results showing the effectiveness of the surveyed techniques in solving partial problems. Freeman-Benson, B. N., Maloney, J. and Borning, A., "An Incremental Constraint Solver", *Communications of the ACM*, Vol. 33, No. 1, pp 54–63, 1990, incorporated herein by reference, describes a method by which to maintain a constraint solution as new constraints are added or as old constraints are removed, describes the representation of required and preferred constraints in a hierarchy, and proposes an algorithm for solving such a hierarchy of constraints in a user interface application. The flexibility of the present invention and its ability to handle various strategies enables the optimization problem presented by dynamic policy selection and soft policy selection to be solved within the same architectural framework.

A particular embodiment that uses soft policy evaluation criteria assigns a weight to each of the selection policies. An itinerary would be evaluated in the Itinerary Validator based on its total weight which is a global measure of how many policies are satisfied by the itinerary how important those policies are (the weight). Instead of finding the first itinerary that satisfies the policies, the Traverser would find an itinerary, calculate its total weight (i.e., a score), and keep searching until the Traverser finds an itinerary above a threshold, or until a time period runs out, or until the Traverser finds an optimal itinerary (when all possible itineraries have been searched).

The power up Strategy Selector selects a Model Traverser for use at power up and possibly a Store Traverser for use later, when a print job is requested. In one version of the printing machine, a Model Traverser used at power up is a Backtrack Traverser.

Mackworth, Alan K., "Consistency in Networks of Relations", *Artificial Intelligence*, Vol. 8, pp 99–118, 1977, incorporated herein by reference, describes a known backtracking search that can be applied to solve problems that are formulated as "constraint satisfaction problems", hereinafter CSPs. A CSP is a problem described using variables, a set of possible values for each variable, and constraints between the values. A solution to the CSP includes finding one or all assignments of values to variables that satisfy all constraints. For example, a typical CSP is the known "map coloring" problem where it is desired to color a map with a predetermined number of colors (e.g., 3) so that no neighboring states have the same color. In the CSP formulation of this problem, the variables are the states, the values are the possible colors for each state (e.g., red, green and blue), and constraints are formulated so that no two neighboring states can be assigned the same color (e.g., the neighbors of each state are identified and constrained to be of different colors). The solution is the assignment of one color to each state so that all neighboring states have different colors.

Backtracking is a search algorithm that can find one or all solutions to a CSP. The general backtracking algorithm includes two routines: one that searches forward (see FIG. 11, step S6) and one that searches backward (see FIG. 12, step S7). FIG. 10 depicts a model of the machine MoM for a simplified printer to be used here as an example. In the scheduler of the present invention, the backtrack algorithm variables are the three machine modules of the MoM (i.e., the feeder, the marker and the stacker which we number 1, 2 and 3 respectively). There are two possible values for each of the variables, and these possible values are the capabilities of each respective module (e.g., each module in the MoM has the capability to process A4 and A5 sheets). The constraints that must be satisfied are based on machine constraints as to which capabilities in one module are compatible with capabilities in another module. A solution is an itinerary formulated as one capability in each module combined such that none of the constraints are violated.

Figure 11:
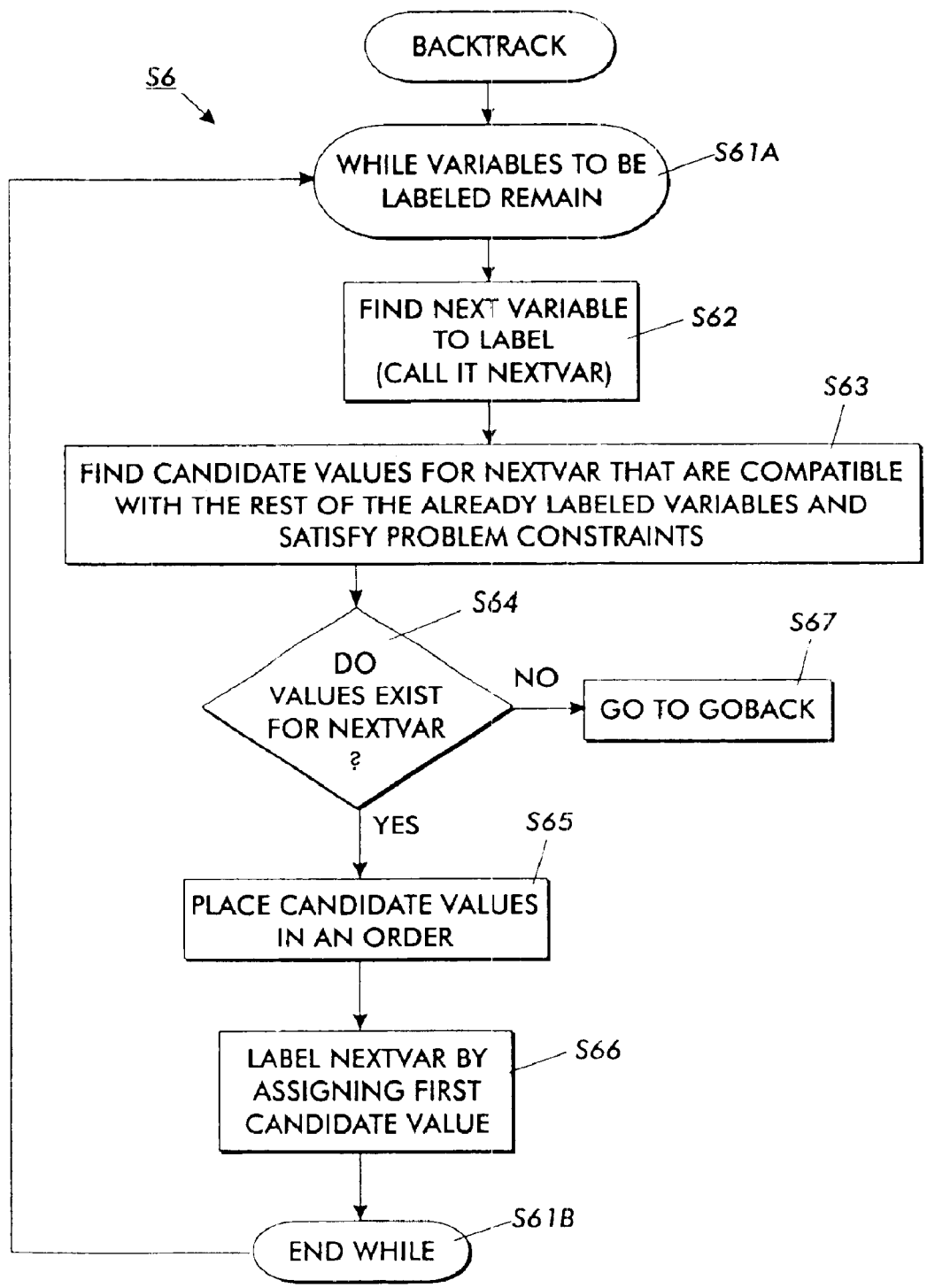
FIG. 11 is a flow chart of a forward search portion of a backtracking algorithm according to the invention.
Figure 12:
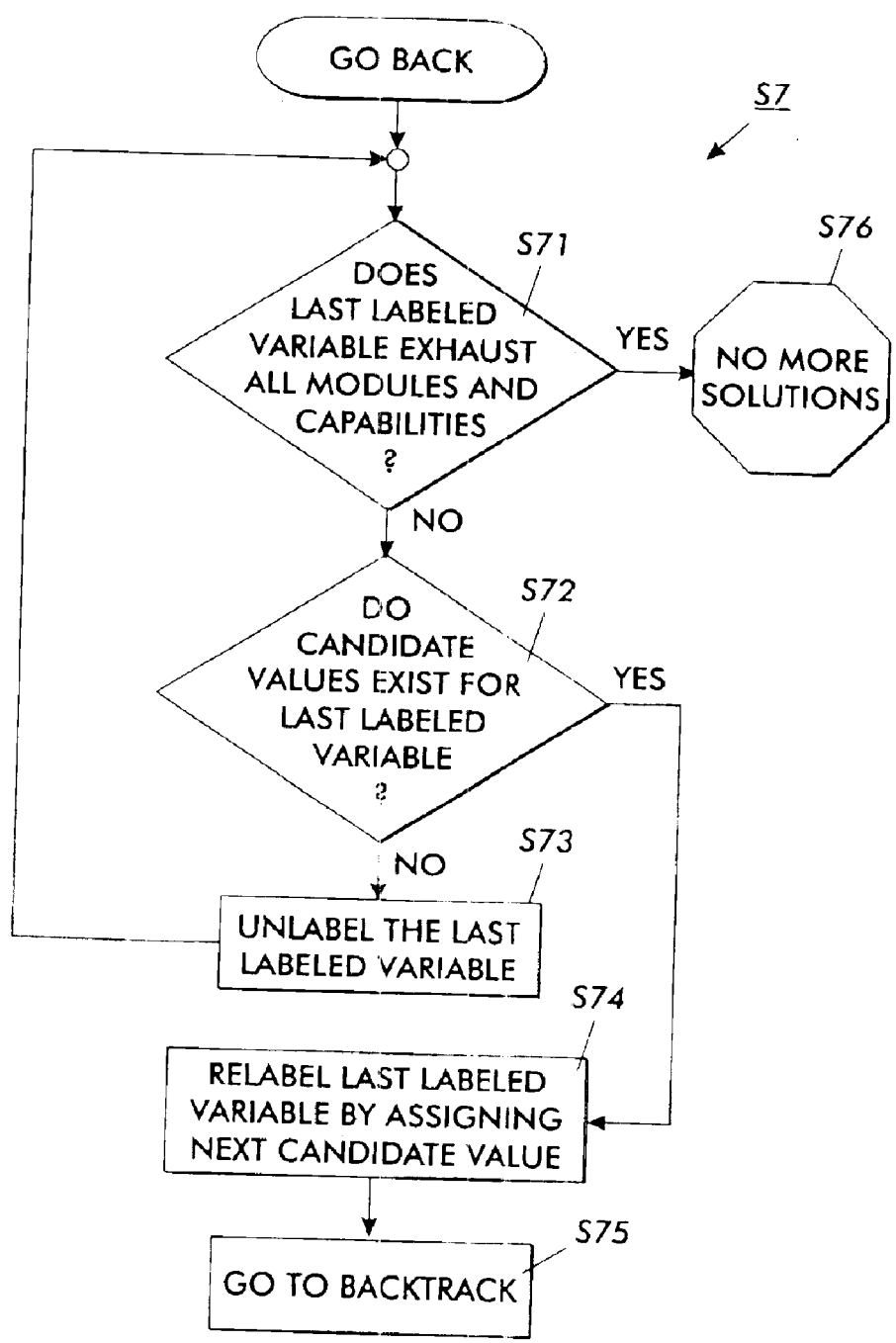
FIG. 12 is a flow chart of a backward search portion of a backtracking algorithm according to the invention.

In FIG. 11, in steps S61A and S61B, the Backtrack traverser loops until an itinerary has been found using all modules. Initially, at step S62 the Backtrack traverser selects a module as the next variable to be assigned a value and calls this variable NextVar. Since an itinerary begins with the feeder module, the feeder module is selected as the first module. At step S63, the candidate values that are valid for the feeder module are formulated to be its capabilities: feedA4 and feedA5. At step S64 the Backtrack traverser asks whether values exist for NextVar (currently the feeder). Since there are two values that exist (feedA4 and feedA5), the Backtrack traverser orders the values at step S65 (e.g., feedA4 before feedA5). At step S66, the Backtrack traverser labels the current NextVar (i.e., the feeder) by assigning to it the first value (i.e., feedA4). Then, by repeating the loop via steps S61A and S61B the search is continued.

The next variable that the Backtrack traverser selects to be labeled is the marker module. This time NextVar is the marker module (step S62). In step S63, the only valid candidate value for the marker module is found to be the markA4 capability since the feeder will be outputting an A4 sheet from the selected feedA4 capability. Step S64 tests whether a value for NextVar exist, and since a value exists, at step S65 it is placed in order. Since only one value exists, step S65 is trivial. At step S66, the Backtrack traverser labels the current NextVar (i.e., the marker) by assigning to it the first value (i.e., markA4).

Similarly, the Backtrack traverser finds that the next variable to label is the stacker module and finds that the stackA4 capability is compatible with the currently selected values for the feeder and marker modules. The Backtrack traverser finds that there are no unlabeled variables left at step S62, and thus it has found an itinerary: feedA4-markA4-stackA4. Since there are no unlabeled variables, there are no values to be found for the next variable at steps S63 and S64, and therefore, at step S67, the Backtrack traverser goes to the GoBack (or backward search) portion.

The Backtrack traverser continues to find more itineraries by "backtracking." At step S72, the Backtrack traverser determines whether there are more valid values for the stacker module. In the present example stackA5 is not a valid value since it is not compatible with the already labeled feeder and marker modules (i.e., A4 sheet output from the marker module). Therefore, at step S73, the last variable (i.e., the stacker module) is unlabeled and the GoBack backtracks further. Then at step S72, it is found that there are no valid values remaining for the marker module (that are compatible with the feedA4 capability chosen for the feeder), and at step S73, the marker module is unlabeled and the GoBack backtracks further. The next time step S72 is processed, a value (i.e., a capability) is found that is compatible with all other labeled variables. Actually, there are no other labeled variables with which the feeder capability must be compatible since the marker and stacker modules have been unlabeled. At step S74, the first variable (i.e., the feeder module) is relabeled with the only other value found among its capabilities. That other value is the feedA5 capability.

At step S75 the GoBack portion of the traverser goes to the beginning of the Backtrack traverser. The Backtrack traverser then searches forward and quickly finds and labels the marker module with the markA5 capability and the stacker module with the stackA5 capability thus finding the second and final valid itinerary: feedA5-markA5-stackA5.

After the second and final itinerary is identified, at steps S64 and S67 the traverser goes to the GoBack portion of the traverser (as it does after finding the first itinerary). Then at step S71 the last labeled variable exhausts consideration of all modules and their capabilities, and at step S76, the traverser terminates since there are no more solutions to look for.

In an alternative embodiment of the invention, where it is desired to shorten the power up sequence time or conserve memory, the power up Model Traverser entirely deleted so that no itineraries need be stored at the power up time. Then, at selection time when a job is to be printed, instead of using a Store Traverser, the Strategy Selector uses a selection time Model Traverser that traverses the model of the machine to first check whether a putative itinerary satisfies all configuration policies, and then checks to see if the itinerary satisfies the selection policies and will be able to process the print job. The selection time Model Traverser may use a full Backtrack Traverser for "on-the-fly" traversing of the model of the machine to find an itinerary that can process the print job. The use of this embodiment may be favored if it necessary to power up quickly and the machine has may different modules and capabilities within the modules.

In yet another embodiment of the invention, the power up traverser is a modified Model Traverser that at power up time generates a list of some of the valid itineraries possible according the model of the machine. This short list of itineraries may be selected by any desired means (e.g., minimize memory storage, most frequently used, etc.); however, the means preferably selects the itineraries most likely to be used by the print shop using the machine. Then, at selection time, a modified Store Traverser traverses this short list of the valid itineraries to search for an itinerary that can process the print job. If no itinerary is found that can process the job, operation of the Store Traverser is followed by operation of a second modified Model Traverser for "on-the-fly" traversing of the model of the machine to find an itinerary that can process the print job from among the remaining possible itineraries that were not searched during the power up sequence.

In a variant of this "on-the-fly" selection time Model Traverser, a valid itinerary, identified during the selection time operation of the Model Traverser, is stored in a memory or added to the memory that stores existing valid itineraries. Subsequently, when another job is submitted for printing, the selection time Store Traverser will first search for a usable itinerary among the stored itineraries that now includes the itinerary that was identified during an operation of the "on-the-fly" selection time Model Traverser and stored. In this way, the stored itineraries reflect the most frequently used itineraries.

In applications where there is limited memory space to store valid itineraries, the "on-the-fly" traverser includes a module to delete a stored itinerary based on some criteria (e.g., delete the itinerary that has remained in the store without use for the longest time). In this way, the itinerary store will reflect the most frequently used itineraries. In this way, the scheduler "learns" the itineraries that are most often used by the print shop.

Ordinarily, power up time refers to the initial application of electrical power to the printer, whether it is once a day, once a week or when the printer is turned back on after maintenance. However, since the itinerary store may be a non-volatile memory (e.g., magnetic disk, flash memory or electrically erasable non-volatile memory), it may not be necessary to initiate the power up processes each time electrical power is newly applied. A non-volatile itinerary store will already have the stored itineraries from before power was interrupted. However, after a modification of the printing machine configuration (i.e., a modified MoM), it will be necessary to initiate the power up processes to adjust for a new MoM. For example, for a machine that is turned off at night and turned on the next morning, it is not necessary to execute all power up processes each morning unless there has been a configuration modification. In such a case, when the machine is turned on in the morning, the machine would conduct an audit of the machine's configuration to detect configuration changes. However, if no changes were detected, the machine would re-load the stored valid itineraries from a non-volatile memory store. If new modules are installed or existing modules modified, the technician would press a "reset" button to reboot and cause a full power up sequence to be initiated.

In an alternative embodiment, the Model Traverser is constructed so that it knows only that a traversal algorithm is used to find itineraries, but does not know how the itineraries are found. In this way the Model Traverser decouples the traversal algorithm itself from the other functions of the Model Traverser. Thus, the Model Traverser can take advantage of abstraction of the actual traversal algorithm in machine independent terms, and different algorithms for traversing can be easily substituted into the system. For example, the Model Traverser could use the Backtrack Traverser algorithm to iterate over the model of the machine (machine graph) to find itineraries. As discussed above, Mackworth, Alan K., "Consistency in Networks of Relations", *Artificial Intelligence*, Vol. 8, pp 99–118, 1977, describes a backtracking algorithm that can be used to find one or all of the solutions for a problem represented as a constraint satisfaction problem.

A different approach, using "genetic" algorithms, could be implemented by substituting a Genetic Traverser algorithm for the Backtrack Traverser algorithm. The Model Traverser would provide the same functionality in either case, even though the underlying algorithms would be different. This enables flexibility and an opportunity for continual improvement of the Model Traverser as new algorithms (e.g., a minimum conflicts algorithm and a backjumping algorithm) are developed, empirically tested and shown to provide performance enhancement. See Minton, S. et al., "Minimizing Conflicts: A Heuristic Repair Method for Constraint Satisfaction and Scheduling Problems", *Artificial Intelligence*, Vol. 58, pp 161–205, 1992, incorporated herein by reference, which describes how a backtracking algorithm can be augmented with a value-ordering heuristic so as to prefer solutions that minimize constraint violations during search. Also Dechter, Rina, "Enhancement Schemes for Constraint Processing: Backjumping, Learning, and Cutset Decomposition", *Artificial Intelligence*, Vol. 41, pp 273–312, 1989, incorporated herein by reference, describes various algorithms for enhancing the performance of the basic backtracking algorithm.

Figure 13:
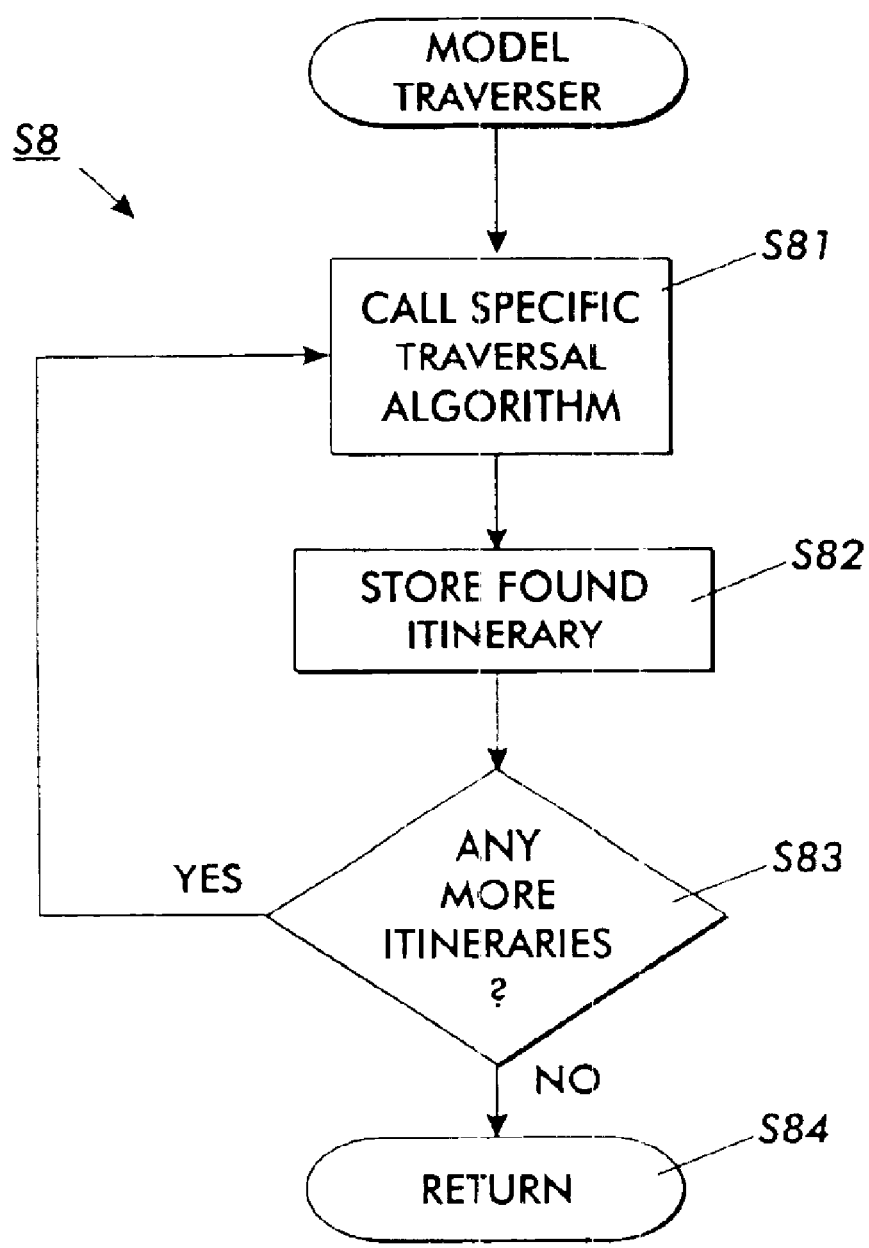
FIG. 13 is a flow chart of a Model Traverser with configurable traversing algorithm according to the invention.

In FIG. 13, the Model Traverser has been configured by the Strategy Selector to use a specific traversing algorithm (e.g., a backtracking algorithm of some particular design, a genetic algorithm, etc.). The Model Traverser performs traversing step S8. Step S8 includes calling the specific traversing algorithm to find an itinerary at step S81, and includes storing an itinerary at step S82 that was found by the traversing algorithm. At step S83, the Model Traverser checks to see if any additional itineraries are to be found. If there are no additional itineraries, the Model Traverser returns to its calling program at step S84. If there are additional itineraries, the traversing algorithm is again called at step S81. This allows the Model Traverser and any system component that uses the Model Traverser to be independent of the specific traversing algorithm that is used to find itineraries. In this way, different algorithms may be developed for different situations and the Strategy Selector can select the appropriate algorithm at power up time.

In yet another alternative embodiment, the traversal algorithm in the Model Traverser is constructed to enable several alternative embodiments due to its representation as a strategy design pattern. Gamma, E., et al., *Design Patterns: Elements of Reusable Object-Oriented Software*, Addison-Wesley Publishers, 1995, incorporated herein by reference, describes the basic strategy design pattern concept. In the present invention, the implementation of the traversing algorithm is designed to use small building blocks of algorithm portions that are combined according to the strategy design pattern. This enables flexibility in various portions of the traversing algorithm. The variability of the algorithm (and correspondingly in search performance) occurs due to different variable and value ordering heuristics that are added to the algorithm. Gent, Ian P., et al., "An Empirical Study of Dynamic Variable Ordering Heuristics for the Constraint Satisfaction Problem", *Principles and Practice of Constraint Programming*, LNAI Series #1118, pp 179–193, 1996, incorporated herein by reference, compares the effectiveness of various variable ordering heuristics on the efficiency of search. A traverser algorithm may perform with different efficiencies depending on the order in which certain variables (e.g., modules in the formulation of the present invention) of a constraint satisfaction problem (CSP) are processed (e.g., the order of module selection in step S62 of FIG. 11). By collecting statistics (or simply heuristics) with a real time monitor, or perhaps "off line" by simulation, or reviewing published comparisons (e.g., the paper by Gent, Ian P., et al.), it is possible to develop a strategy as to a preferred order (called the strategy design pattern architecture) in which to consider the modules (generally, the variables in the CSP) in step S62 of FIG. 11.

The strategy design pattern architecture may vary depending on other factors (e.g., a small print shop versus a big print shop). The strategy design pattern architecture of the traversing algorithm enables the algorithm to be configured with various variable and value ordering heuristics. These heuristics and/or strategies can be developed for various machine configurations and job requirements. The Strategy Selector can be used to select desired heuristics to be used by the Model Traverser's algorithm. The Strategy Selector evaluates the complexity of the current machine configuration and selects whatever strategy has been shown to be effective or efficient in such a configuration.

Elements of the backtracking algorithm include steps S61A and S61B (FIG. 11) which define the end condition when the evaluation is to end (EndCondition), step S62 (FIG. 11) which defines the order of variables to be evaluated (VariableOrderer), and step S63 (FIG. 11) which defines the order in which the values of the constraint satisfaction problem are evaluated (ValueOrderer). When formulated as a strategy design pattern, the backtracking algorithm merely asks that the EndCondition, VariableOrderer and ValueOrderer steps be performed without knowing exactly how the steps are performed. For example, the traversing algorithm calls the VariableOrderer and requests it to provide the next variable to consider. The VariableOrderer itself could be any of a number of different implementations (e.g., one that checks for the next machine module, or one that checks for the machine module with the most number of constraints, etc.). The strategy design pattern allows the backtracking algorithm framework (e.g., FIG. 11) to remain the same while the underlying steps of the algorithm can be interchanged with different implementations.

In another embodiment, the Store Traverser iterates through the stored list of valid itineraries according to configurable retrieval criteria or selection policies that the Store Traverser uses to determine which itineraries to consider first. For example, the Store Traverser may use retrieval criteria 1 that specifies "consider first all itineraries with ready capabilities", then the Store Traverser moves on to retrieval criteria 2 that specifies "consider next all itineraries with internally pending capabilities", and so on. The retrieval criteria are added and deleted from the configuration of the Store Traverser by a Strategy Selector or a monitor module just like portions of the backtrack algorithm or the policies.

In FIG. 14, a Store Traverser includes a double loop architecture in process step S9. The inner loop is controlled by steps S93A and S93B, and in the inner loop, all stored itineraries are checked against a criteria (e.g., itineraries that are "ready") to find a valid itinerary that meets the criteria. The outer loop is controlled by steps S91A and S91B, in the outer loop, all criteria listed in a criteria list are selected and processed by the inner loop in order to find a valid itinerary that meets the criteria before an "itinerary not found" condition is declared. Several different criterias may be stored (e.g., choose itineraries that use only modules capabilities that are "ready", choose criteria that use high capacity feeders, choose criteria that use high quality markers, etc.).

The stored criterias are selection policies, and the Strategy Selector selects one or more criterias to form a list of criterias to be used by the Store Traverser. In step S92, a next criteria is selected for processing. In step S94, the next itinerary is selected for checking, and in step S95, the selected itinerary is checked against the currently selected criteria. In step S96, the itinerary is declared valid if it meets the requirements of the current criteria. If the itinerary is declared valid, the itinerary is said to be found at step S97, and if the itinerary is not declared to be valid after all stored itineraries have been checked against all criteria, then the itinerary is said to be not found at step S98.

It will be appreciated that there may be a long list of itineraries, and the efficiency of the Store Traverser may depend on the order in which the list of itineraries is searched. It will also be appreciated that there may be a list of criteria, and the efficiency of the Store Traverser may depend on the order in which the list of criteria is searched. As in the case of the model traversing algorithms, the store traversing algorithm depicted in FIG. 14 may be abstracted so that steps S92, S94 and S95 are merely calls to other routines that are algorithm fragments. Alternative versions of these algorithm fragments may be developed, and the Strategy Selector configures the Store Traverser with specific algorithm fragments based on a desired strategy design pattern as in the case of a model traversing algorithm.

Having described preferred embodiments of a novel print engine scheduling method and apparatus (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims:

What is claimed is:

1. A scheduler for a machine comprising:
   a selector to select a traverser and to select policies from a library based on a model of the machine; and
   the traverser that is selected by the selector to look for a preferred itinerary,
   wherein the traverser includes:
   a first module to choose an itinerary;
   a second module to calculate a combined weight; and
   logic to repeatedly operate the first and second modules to choose additional itineraries from the group of itineraries and calculate their combined weight until an end condition is reached.

2. The scheduler of claim 1, further comprising a third module to choose after the end condition is reached an itinerary that has a combined weight calculated by the second module that is greater than a combined weight of any other itinerary calculated by the second module.

3. The scheduler of claim 1, wherein:
   the first module chooses an itinerary from a group of itineraries, the group of itineraries being one of (i) a sub-set of the itineraries in a list of valid itineraries and (ii) all of the itineraries in the list of valid itineraries; and
   the second module includes (i) an itinerary validator to compute an itinerary weight for the chosen itinerary for each of the policies and (ii) a combiner to combine the computed itinerary weight for each of the policies into a combined weight for the chosen itinerary.

4. The scheduler of claim 1, wherein the end condition includes at least one of when a calculated combined weight for an itinerary exceeds a predetermined threshold, when a predetermined time has elapsed, when a combined weight for each of a predetermined number of itineraries has been calculated, and when a combined weight for each itinerary in the group of itineraries has been calculated.

5. A method of print scheduling for a machine comprising steps of:
   selecting policies from a library based on a model of the machine;
   selecting a traverser; and
   traversing one of a model of the machine and a list of valid itineraries to look for a preferred itinerary,
   wherein the step of traversing includes steps of:
   choosing an itinerary;
   calculating a combined weight; and
   repeating the steps of choosing and calculating until an end condition is reached.

6. The method of claim 5, further comprising a step of choosing after the end condition is reached an itinerary that has a combined weight calculated by the second module that is greater than a combined weight of any other itinerary calculated by the second module.

7. The method of claim 5, wherein:
   the step of choosing chooses an itinerary from a group of itineraries, the group of itineraries being one of (i) a sub-set of the itineraries in a list of valid itineraries and (ii) all of the itineraries in the list of valid itineraries; and
   the step of calculating includes (i) computing an itinerary weight for the chosen itinerary for each of the policies and (ii) combining the computed itinerary weight for each of the policies into a combined weight for the chosen itinerary.

8. The method of claim 5, wherein the end condition includes at least one of when a calculated combined weight for an itinerary exceeds a predetermined threshold, when a predetermined time has elapsed, when a combined weight for each of a predetermined number of itineraries has been calculated, and when a combined weight for each itinerary in the group of itineraries has been calculated.

9. A computer readable media having modules stored thereon to control a processor, the modules comprising:
   a module to select policies from a library based on a model of the machine;
   a module to select a traverser; and
   the traverser to traverse one of a model of the machine and a list of valid itineraries to look for a preferred itinerary,
   wherein the traverser includes:
   a first sub-module to choose an itinerary;
   a second sub-module to calculate a combined weight; and
   a repeat module to repeatedly operate the first and second sub-modules until an end condition is reached.

10. The media of claim 9, further comprising a module to choose after the end condition is reached an itinerary that has a combined weight calculated by the second module that is greater than a combined weight of any other itinerary calculated by the second module.

11. The media of claim 9, wherein:
    the first sub-module chooses an itinerary from a group of itineraries, the group of itineraries being one of (i) a sub-set of the itineraries in a list of valid itineraries and (ii) all of the itineraries in the list of valid itineraries; and
    the second sub-module includes (i) logic to compute an itinerary weight for the chosen itinerary for each of the policies and (ii) logic to combine the computed itinerary weight for each of the policies into a combined weight for the chosen itinerary.

12. The media of claim 9, wherein the end condition includes at least one of when a calculated combined weight for an itinerary exceeds a predetermined threshold, when a predetermined time has elapsed, when a combined weight for each of a predetermined number of itineraries has been calculated, and when a combined weight for each itinerary in the group of itineraries has been calculated.

* * * * *